US007783553B2

(12) United States Patent
Gryziecki

(10) Patent No.: US 7,783,553 B2
(45) Date of Patent: *Aug. 24, 2010

(54) ARTICLE OF MANUFACTURE FOR MANAGING RETIREMENT AND OTHER INVESTMENTS THAT USE AN ASSET ACCUMULATION STRATEGY

(76) Inventor: Gene Gryziecki, 21 W319 Glen Park Rd., Lombard, IL (US) 60148-5184

( * ) Notice: Subject to any disclaimer, the term of this patent is extended or adjusted under 35 U.S.C. 154(b) by 426 days.

This patent is subject to a terminal disclaimer.

(21) Appl. No.: 11/877,023

(22) Filed: Oct. 23, 2007

(65) Prior Publication Data

US 2008/0133428 A1 Jun. 5, 2008

Related U.S. Application Data

(63) Continuation of application No. 11/688,383, filed on Mar. 20, 2007, now Pat. No. 7,296,000.

(60) Provisional application No. 60/872,686, filed on Dec. 4, 2006.

(51) Int. Cl.
*G06Q 40/00* (2006.01)
(52) U.S. Cl. .......................... 705/36 R; 705/35; 705/39
(58) Field of Classification Search ................... 705/35, 705/39, 36 R
See application file for complete search history.

(56) References Cited

U.S. PATENT DOCUMENTS

| 5,193,056 A | 3/1993 | Boes |
| 5,590,037 A | 12/1996 | Ryan et al. |
| 5,761,441 A | 6/1998 | Bennett |
| 5,802,500 A | 9/1998 | Ryan et al. |

(Continued)

OTHER PUBLICATIONS

Paul S. Marshall "A Statistical Comparison of Value Averaging vs. Dollar Cost Averaging and Random Investment Techniques," Journal of Financial and Strategic Decisions, vol. 13, No. 1, Spring 2000, pp. 87-99 (13 pages).

(Continued)

*Primary Examiner*—Jagdish N Patel
(74) *Attorney, Agent, or Firm*—Panitch Schwarze Belisario & Nadel LLP

(57) ABSTRACT

An article of manufacture is provided to make decisions regarding funding additional contributions to an investment that is funded using an asset accumulation strategy. A data processor automatically determines an absolute value of a compound average annual rate of return of the investment for a plurality of successive time instances, and an absolute value of an internal rate of return of the investment for a plurality of successive time instances. The data processor then identifies a first time instance when the absolute value of the compound average annual rate of return of the investment exceeds the absolute value of the internal rate of return of the investment. Another article of manufacture identifies a first time instance when the compound average annual rate of return of the investment exceeds the internal rate of return of the investment and when a total return is greater than zero. Another article of manufacture identifies a first time instance when the net present value of the investment is less than zero and the total return is greater than zero. The first time instance represents the time in which it is recommended that funding of additional contributions to the investment should be stopped. The data processor then outputs a message recommending that funding of additional contributions to the investment should be stopped upon identifying the first time instance.

21 Claims, 43 Drawing Sheets

U.S. PATENT DOCUMENTS

| | | | |
|---|---|---|---|
| 5,819,238 | A | 10/1998 | Fernholz |
| 6,014,642 | A | 1/2000 | El-Kadi et al. |
| 6,564,191 | B1 | 5/2003 | Reddy |
| 7,003,483 | B1 | 2/2006 | Davis |
| 2003/0036989 | A1 | 2/2003 | Bhatia |
| 2004/0088236 | A1 | 5/2004 | Manning |
| 2005/0102206 | A1 | 5/2005 | Savasoglu et al. |
| 2006/0015429 | A1 | 1/2006 | Sullivan et al. |
| 2006/0089892 | A1 | 4/2006 | Sullivan et al. |
| 2006/0253356 | A1 | 11/2006 | Charles et al. |

OTHER PUBLICATIONS

Richard E. Williams et al., "Lump Sum Beats Dollar-Cost Averaging," Journal of Financial Planning, vol. 17, No. 6, Jun. 2004, pp. 92-95, Abstract only (1 page).

Robert J. Atra et al., "Dollar-cost Averaging and seasonality: some international evidence," Journal of Financial Planning, vol. 14, No. 7, Jul. 2001, pp. 98-103, Abstract only (1 page).

Ronald J. Balvers et al., "Autocorrelated returns and optimal intertemporal portfolio choice," vol. 43, Nov. 1997, pp. 1537-1551, Abstract only (1 page).

American Century Investments brochure: "Invest in your financial future today . . . with Automatic Investing", American Century Proprietary Holdings, 2005 (2 pages).

Herbert B. Mayo, "Investments, An Introduction," Second Edition, Holt, Rinehart and Winston, Inc., 1988, pp. 292-294, 515 (6 pages).

Richard Brealey et al., "Principles of Corporate Finance," McGraw-Hill Book Company, 1981, pp. 68-76 (11 pages).

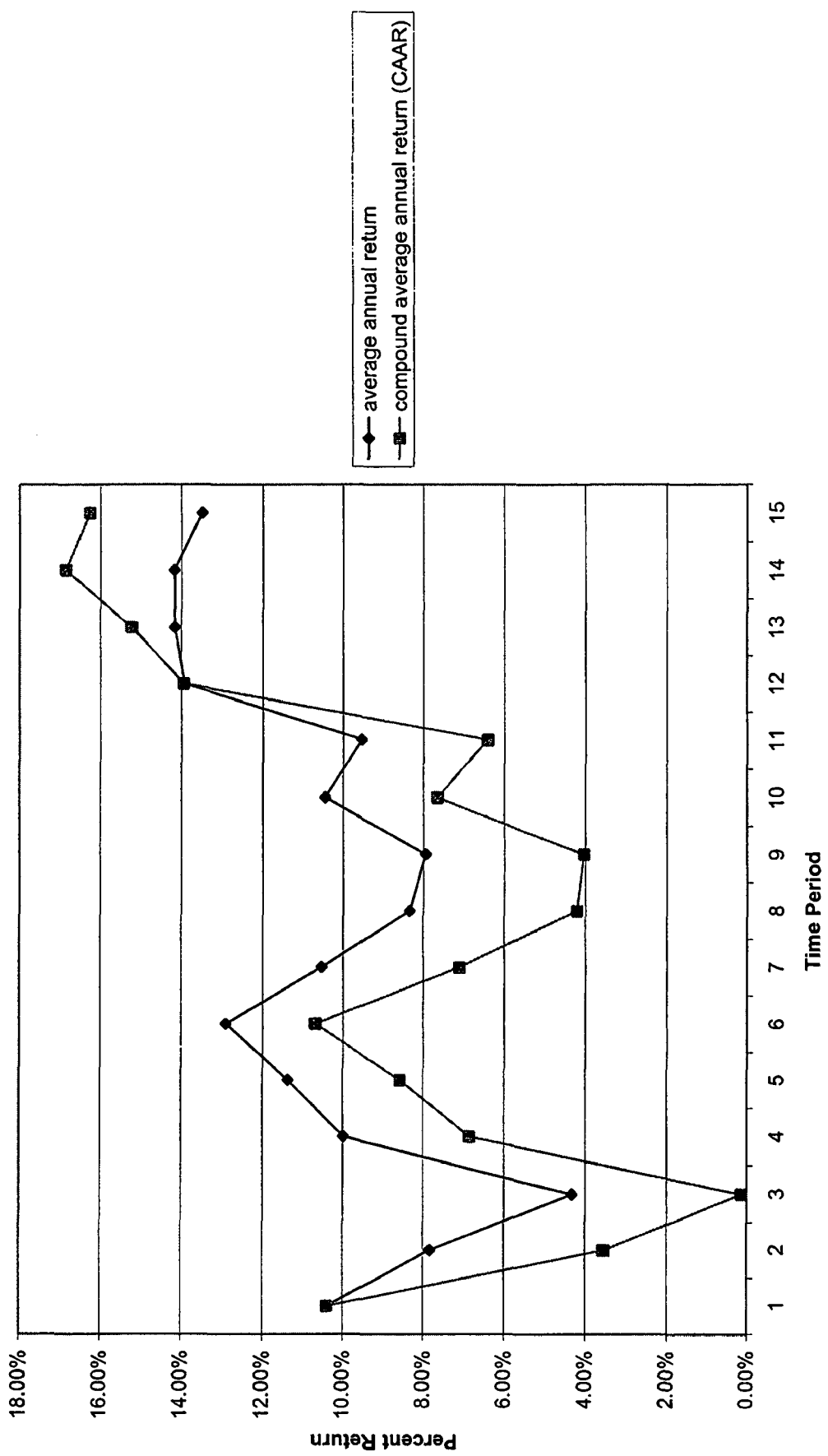

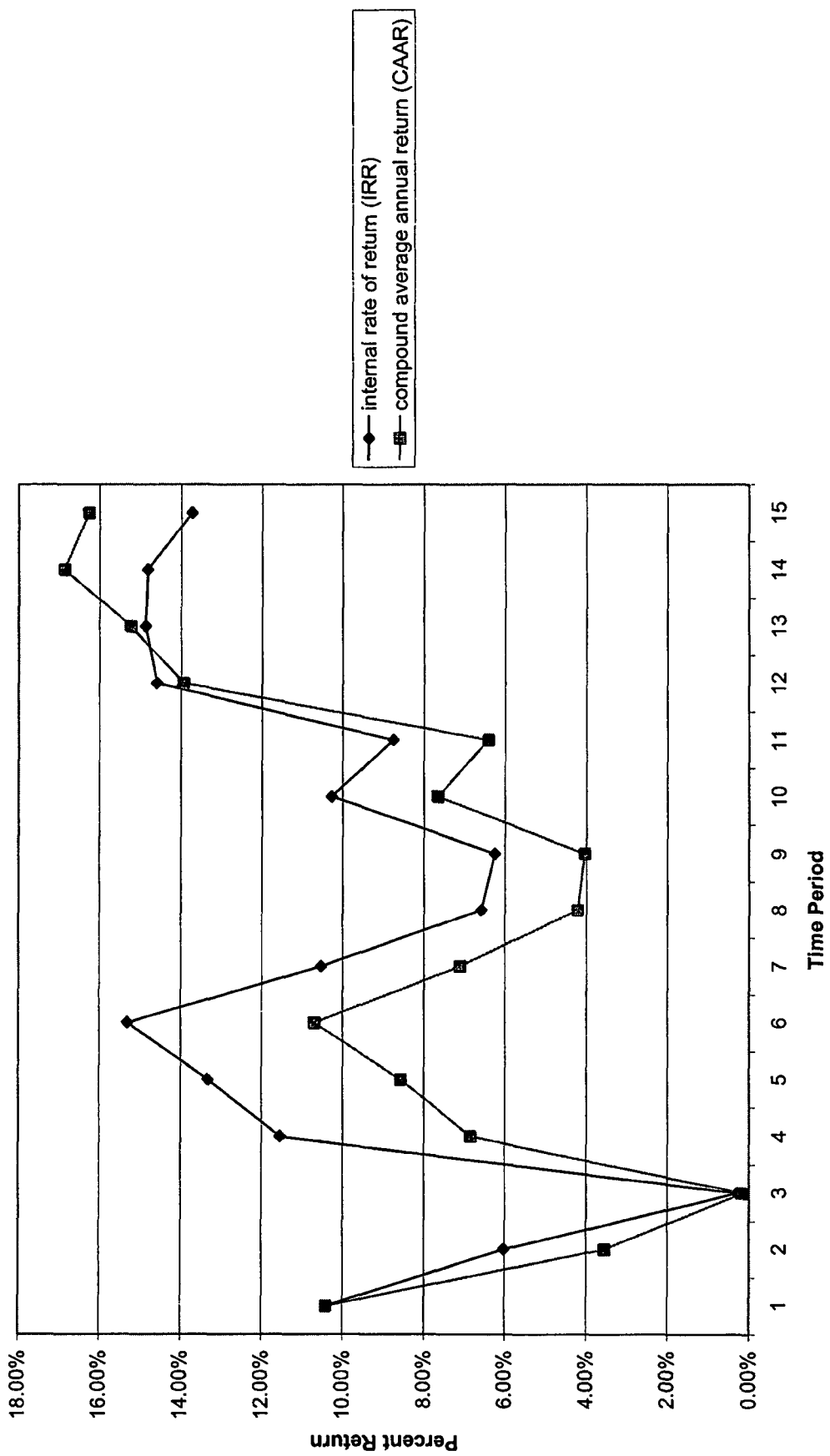
Fig 2 - fund #1 internal rate of return (IRR) and compound average annual return versus time

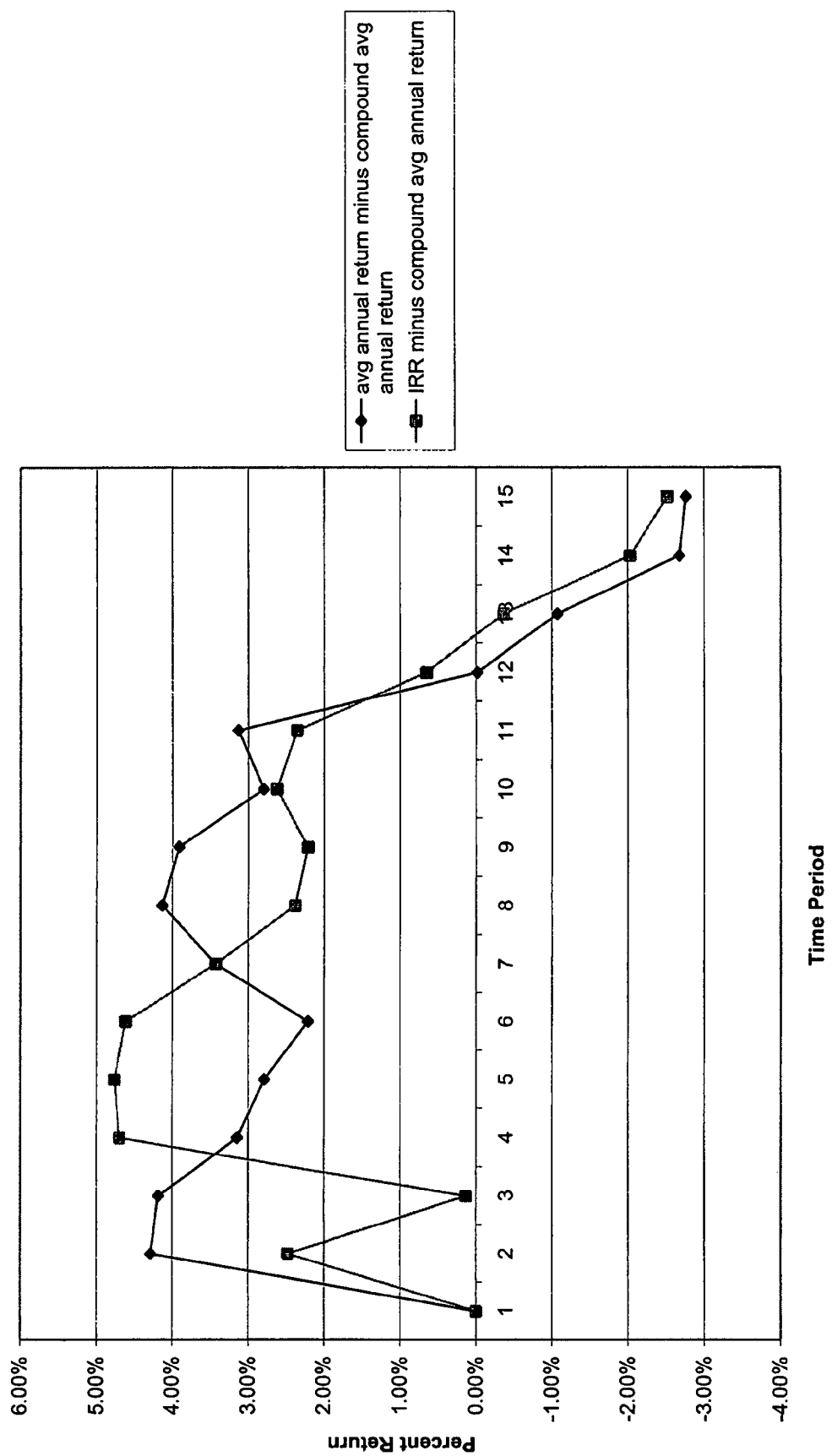

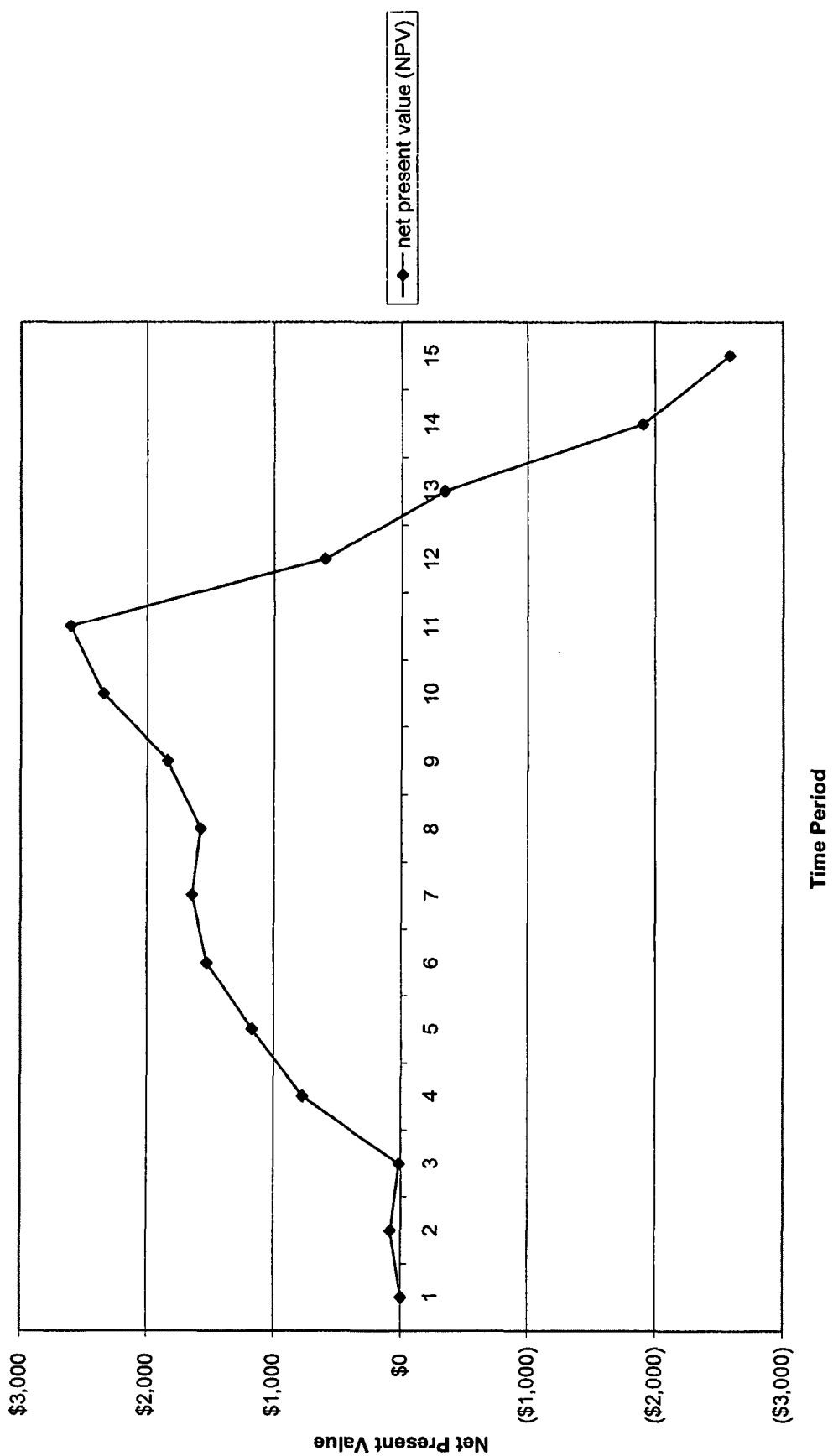

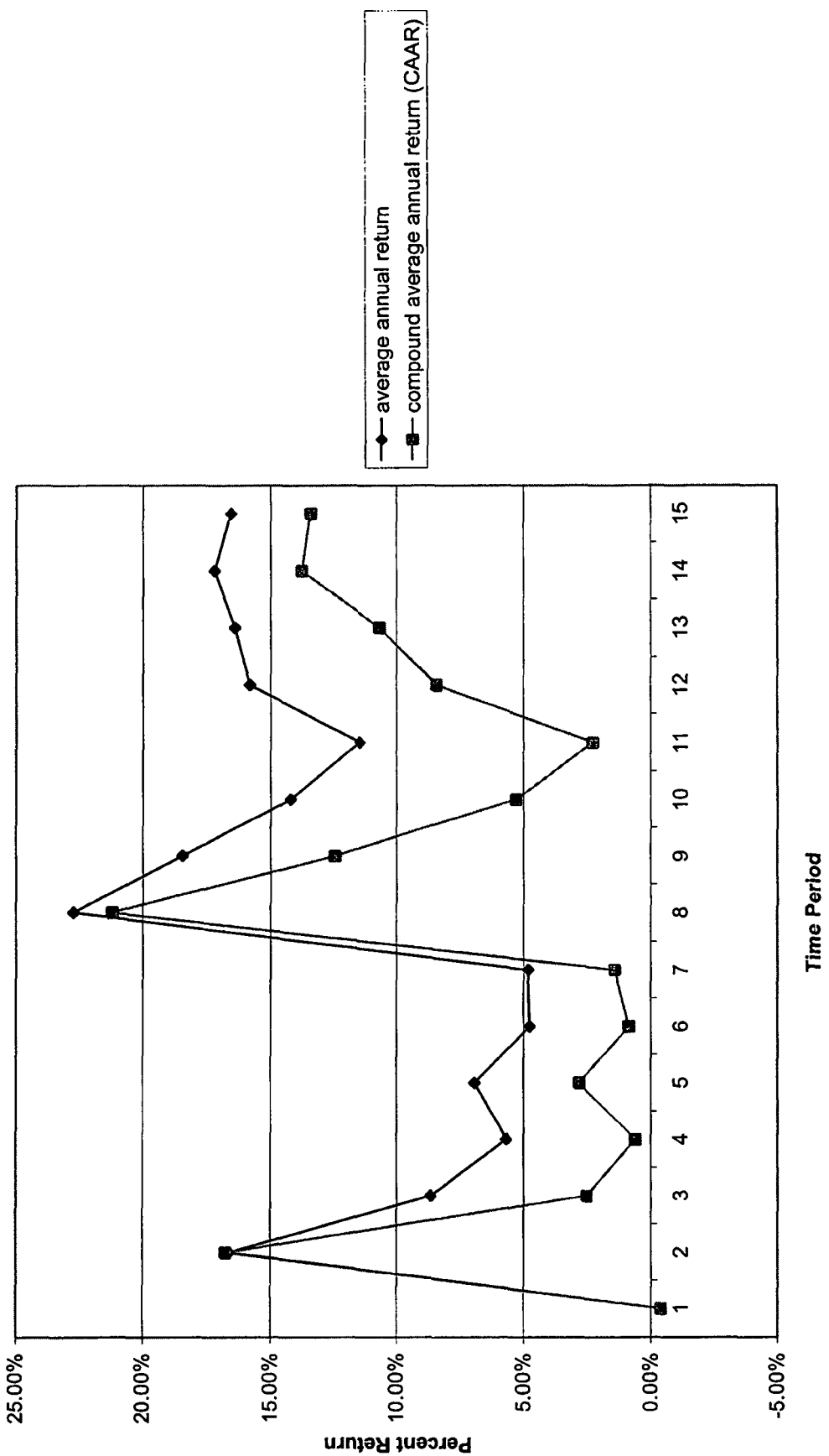

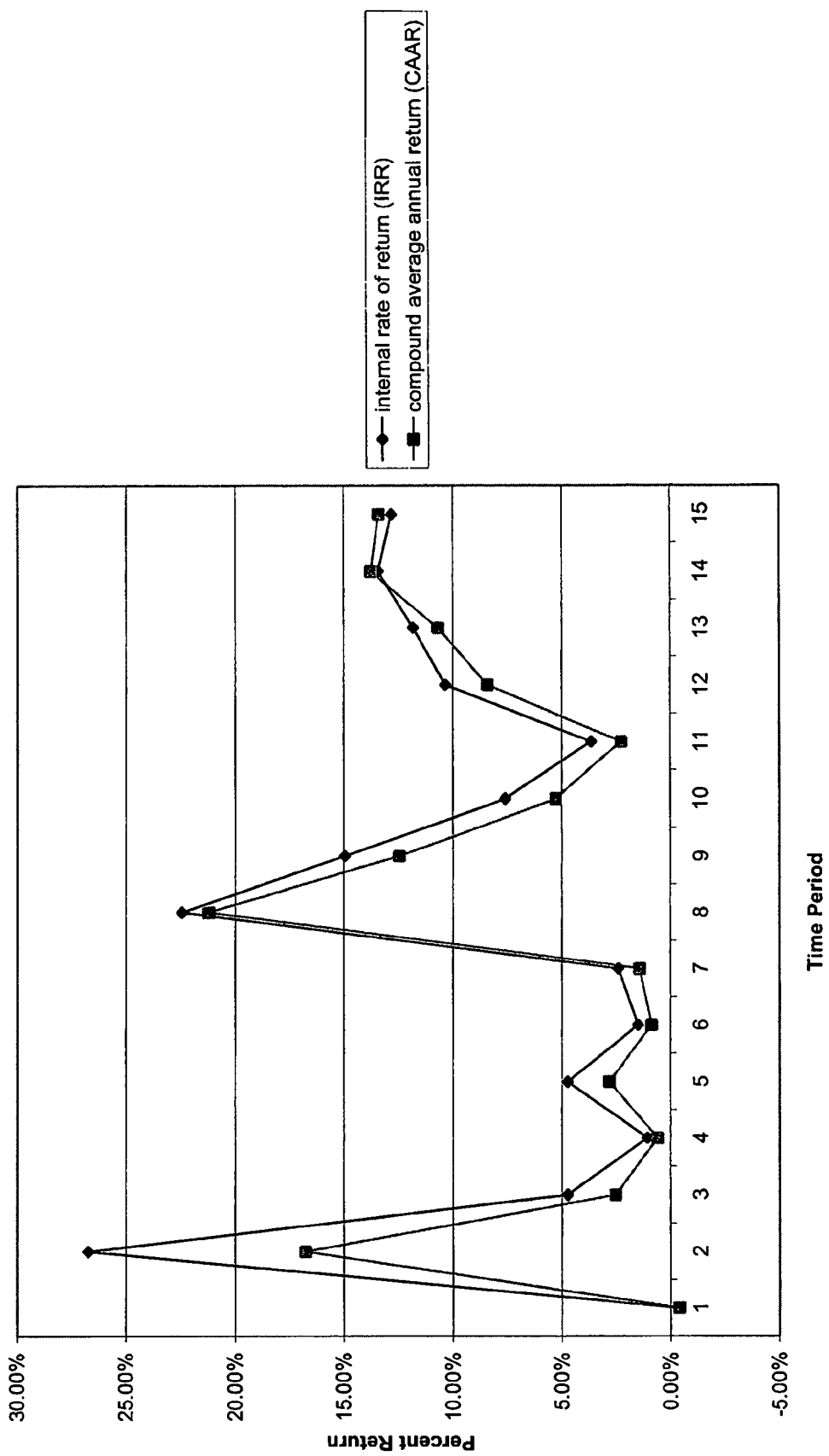

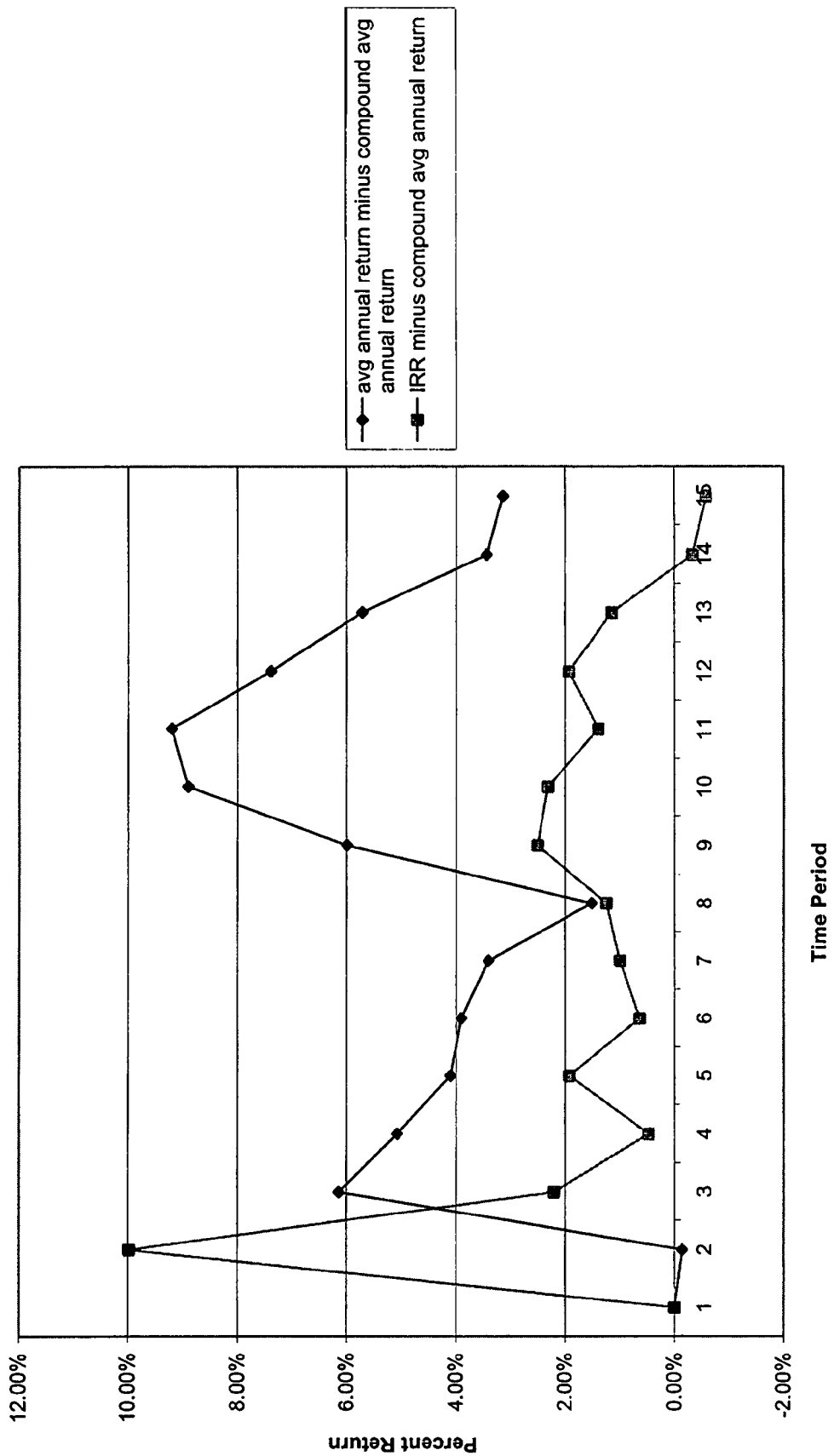

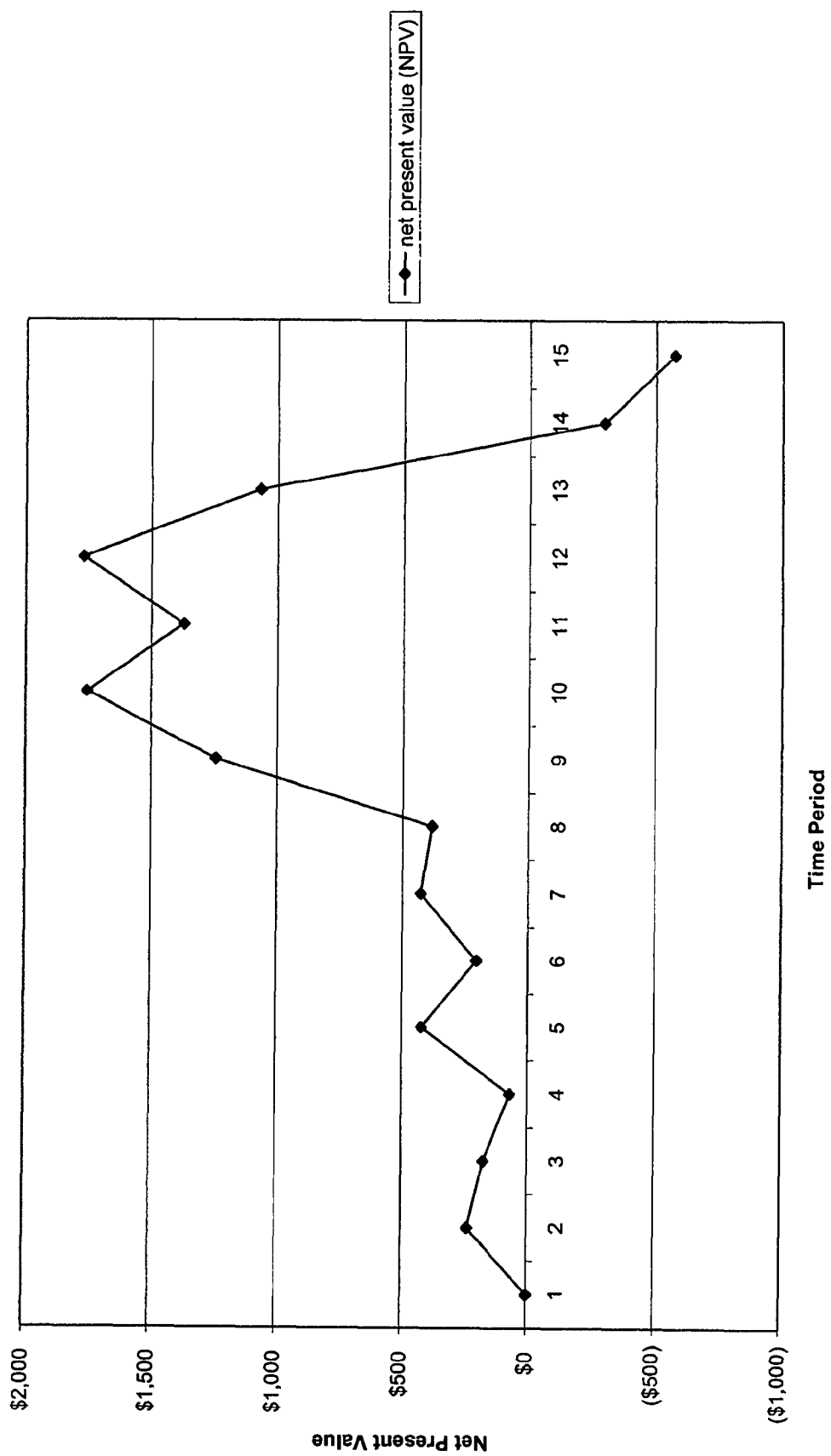

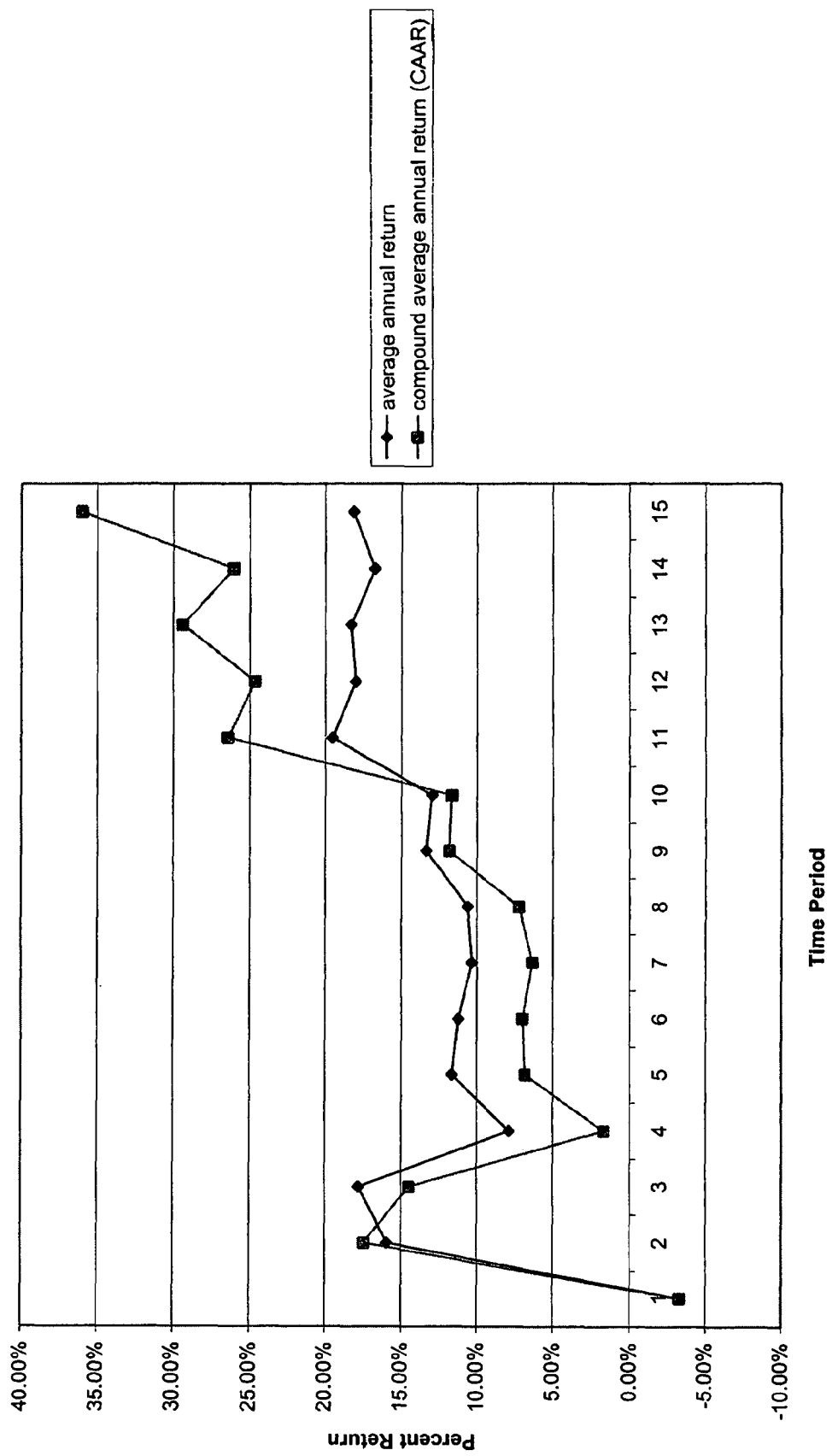

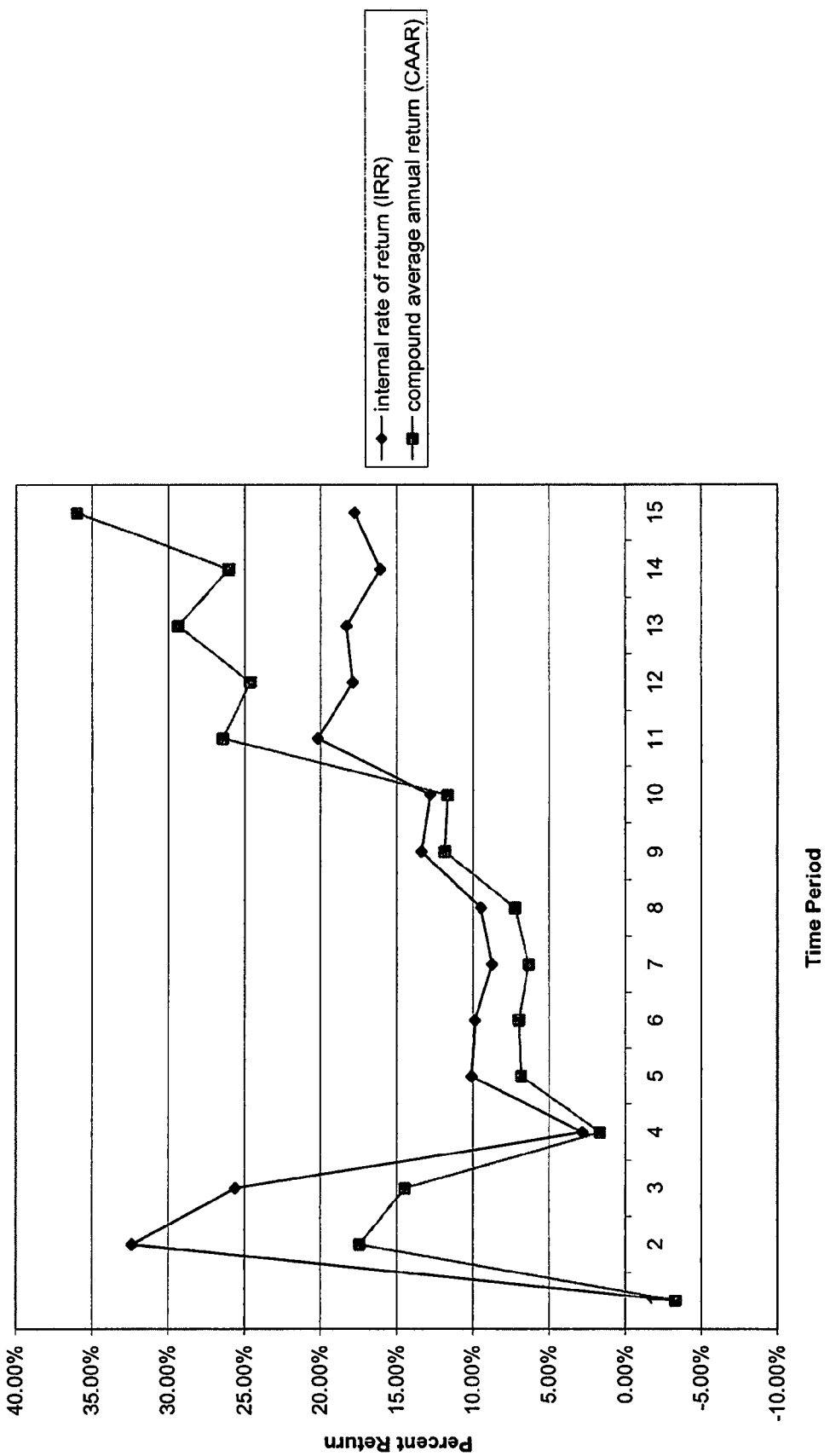

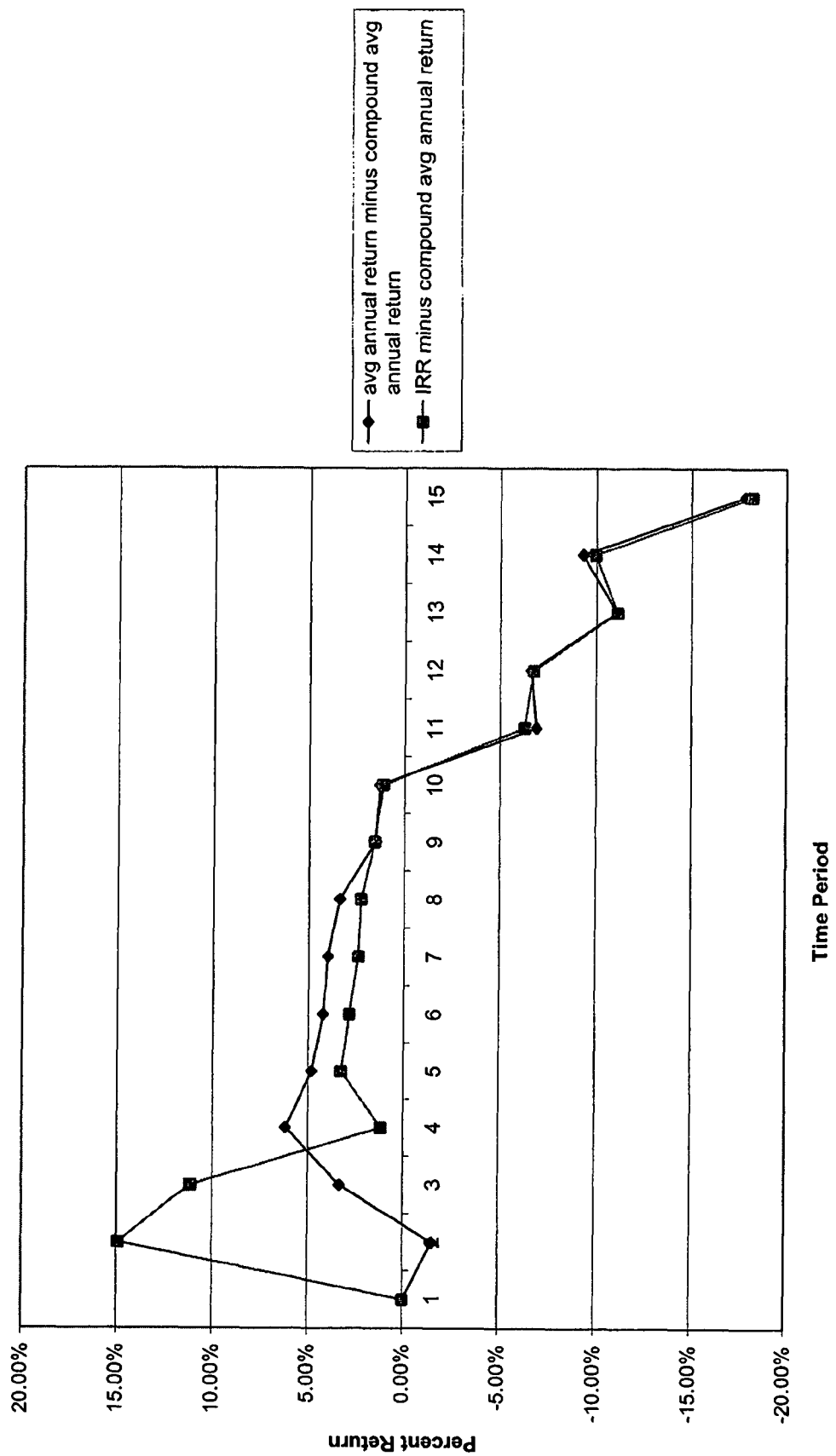

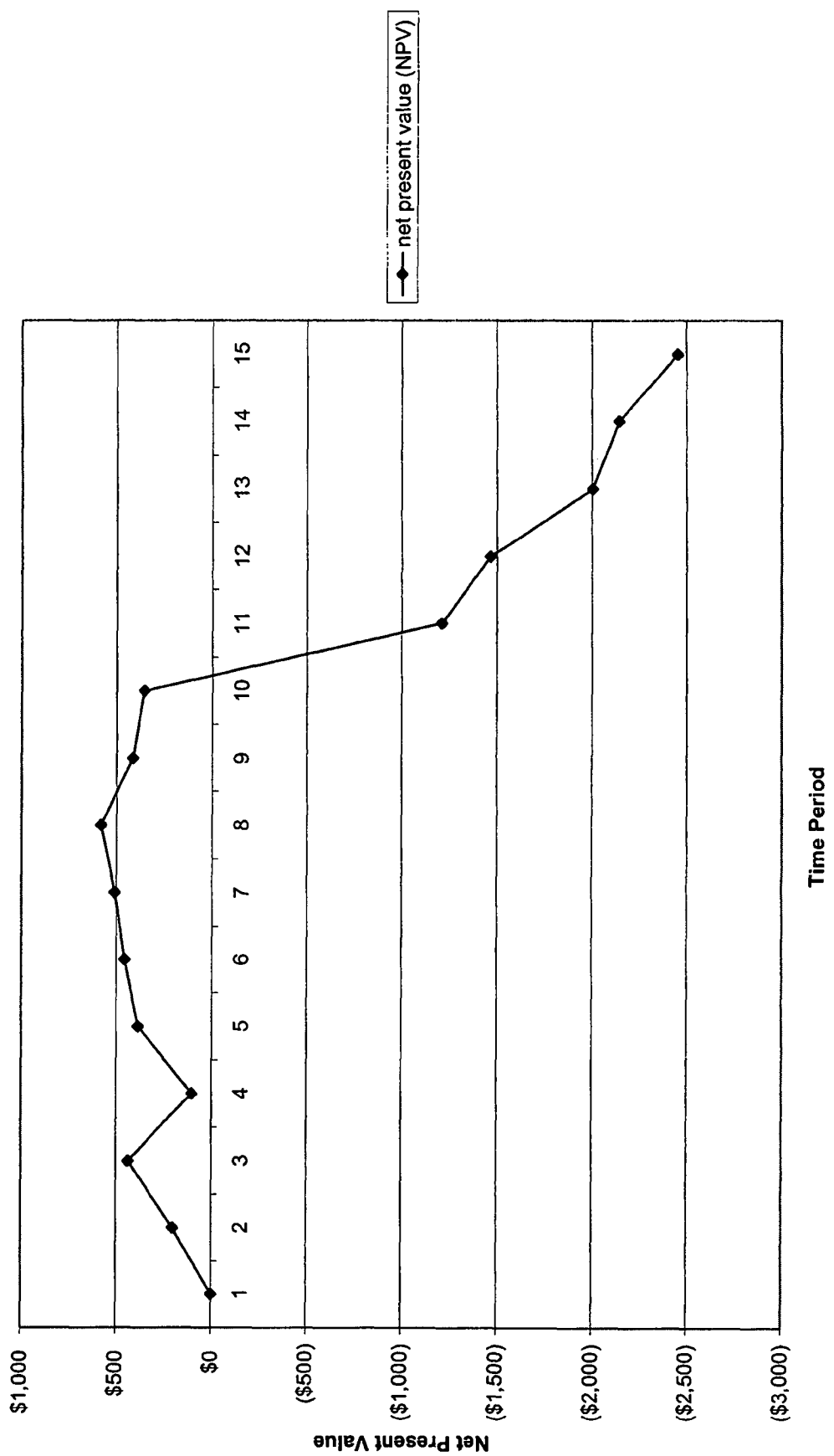

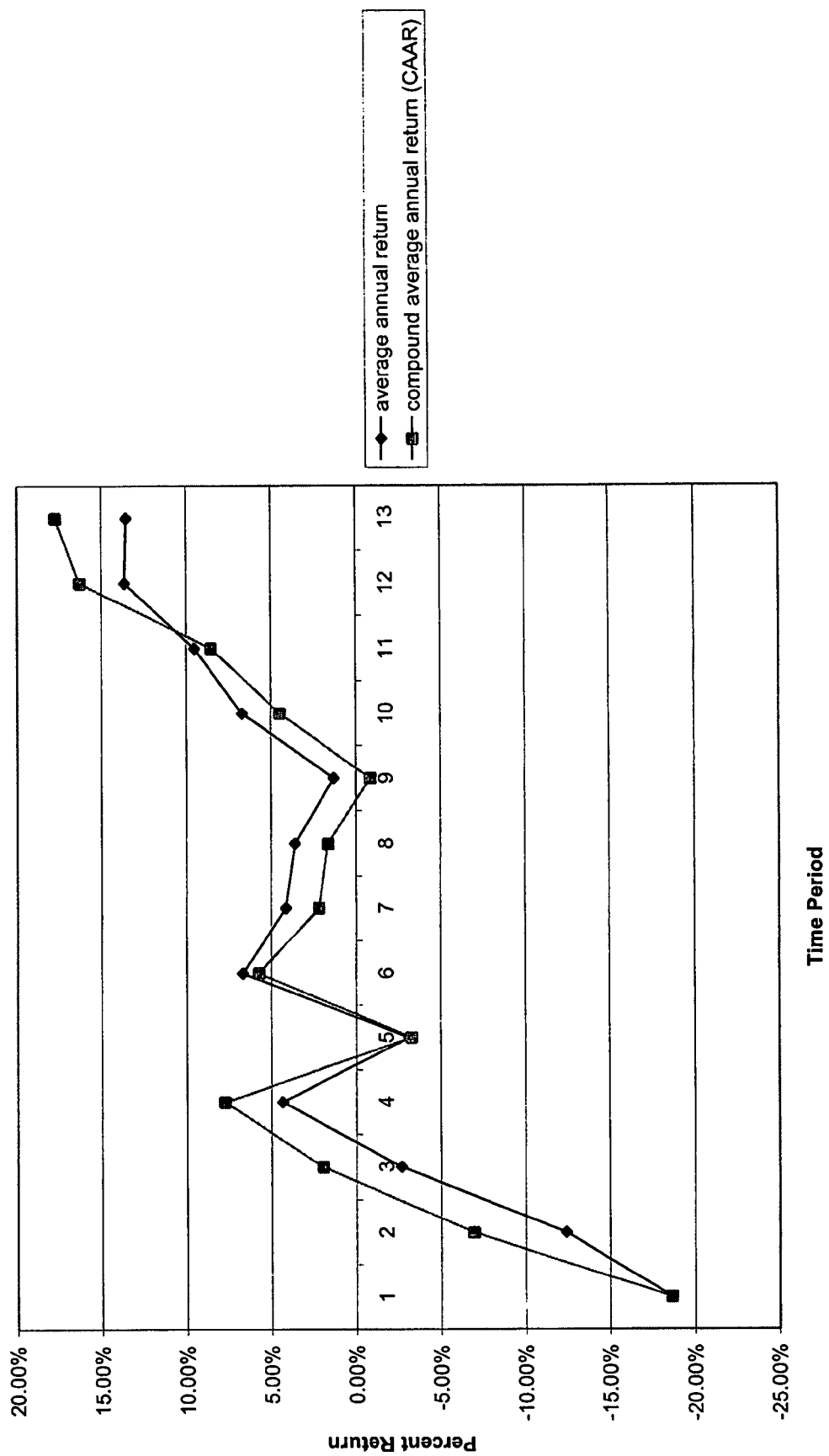
Fig 13 - fund #4 average annual and compound average annual returns versus time

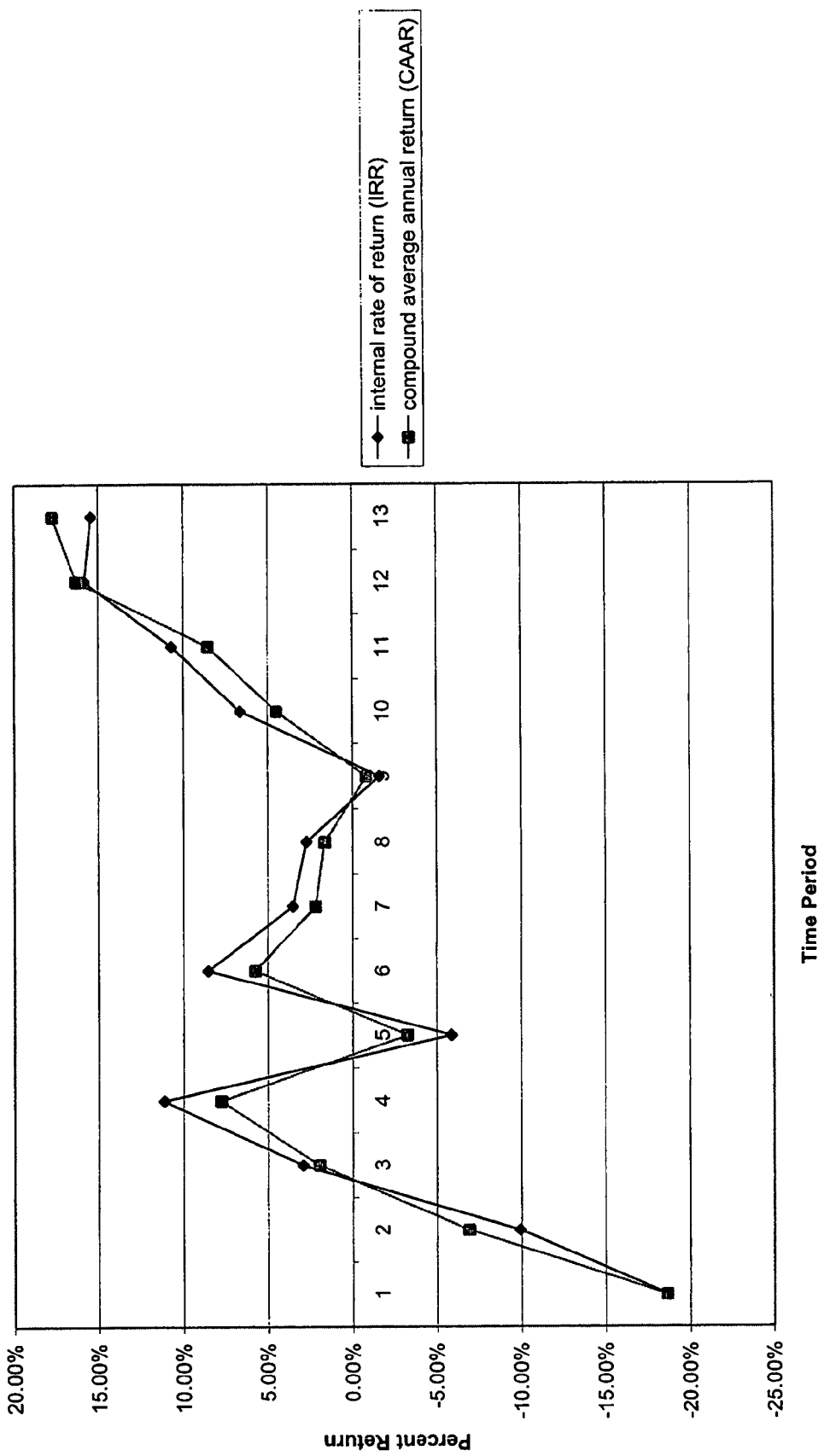

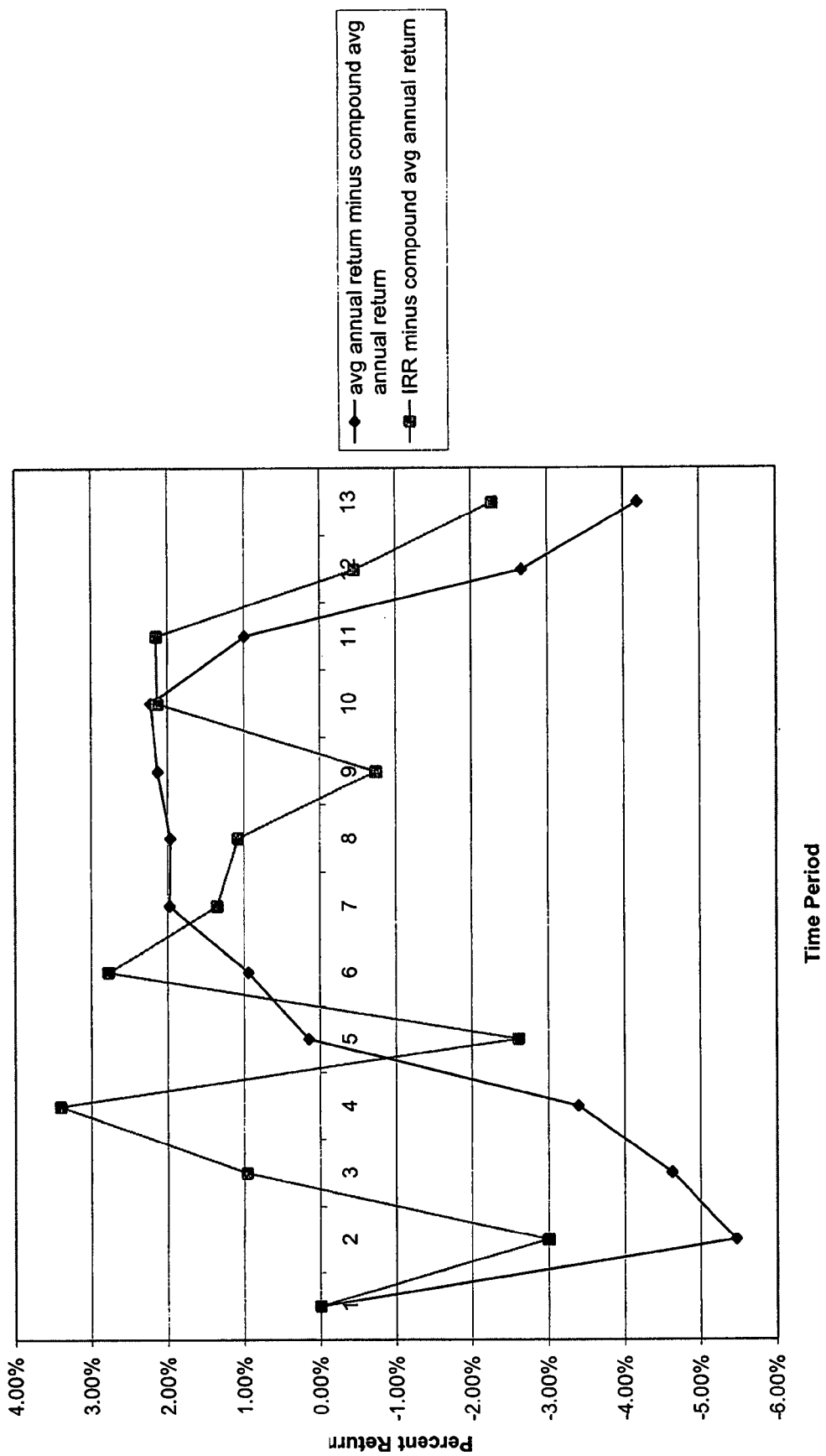

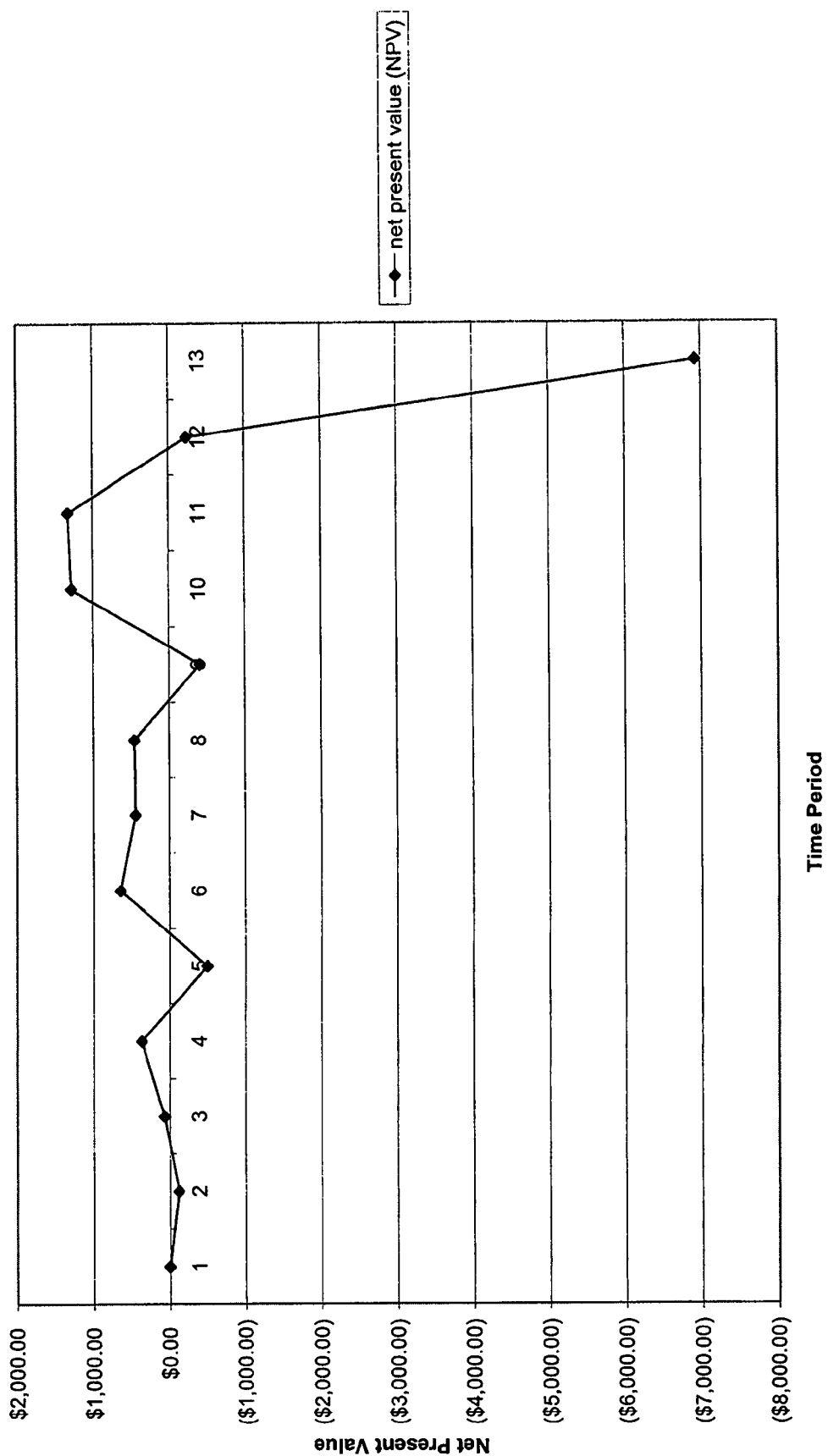

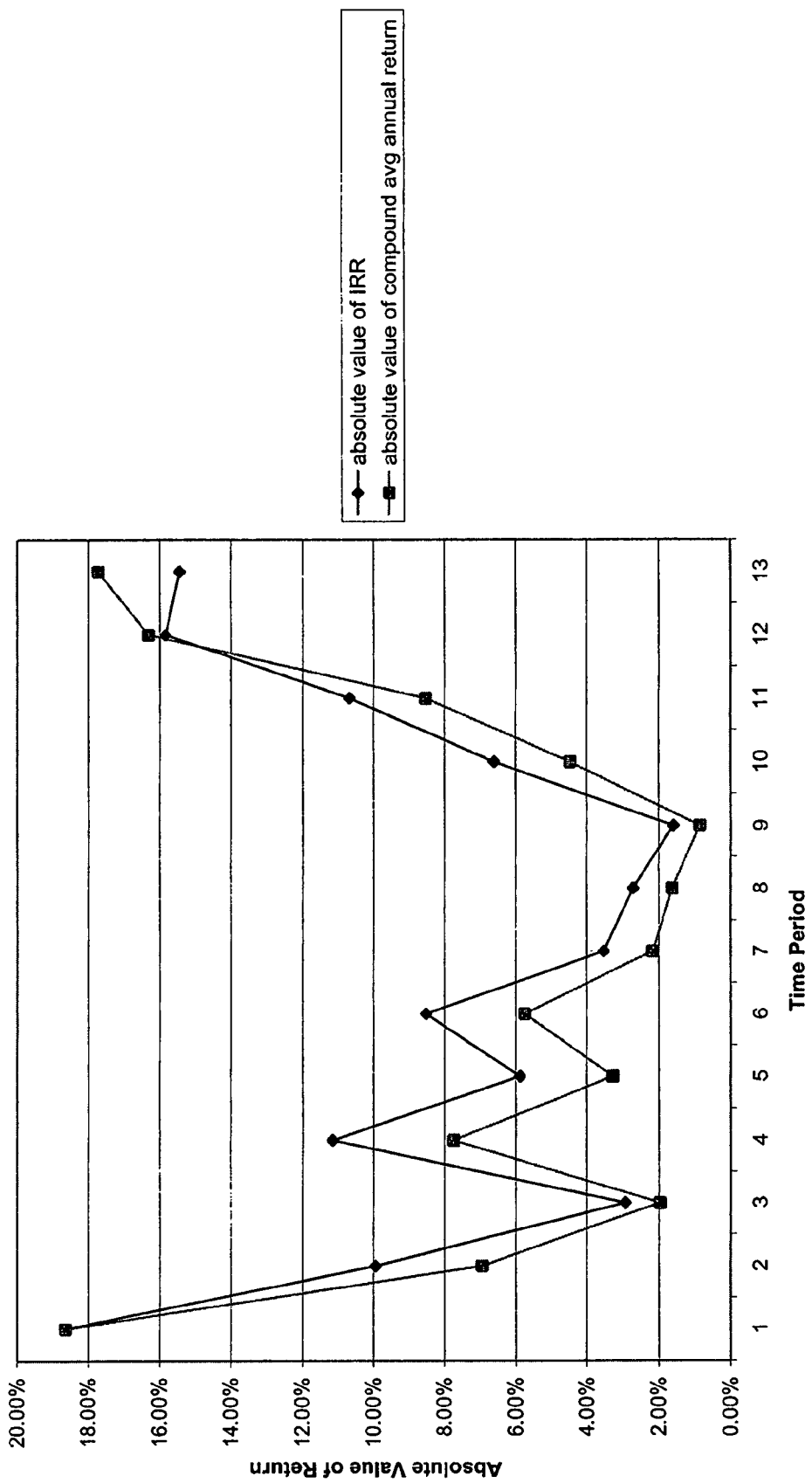

| period | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| yearly out of pocket (oop) investment | 500 | 2490 | 3630 | 1980 | 1980 | 1980 | 1980 | 1980 | 1980 | 1980 | 1980 | 1980 | 1980 | 600 |
| year end market value | 552 | 3202 | 6648 | 10956 | 15115 | 20617 | 21771 | 22082 | 25215 | 36156 | 38297 | 65318 | 78731 | 90788 |
| DATA | | | | | | | | | | | | | | |
| CASH FLOW CALCULATIONS | | | | | | | | | | | | | | |
| 1 | -500 | -2490 | -3630 | -1980 | -1980 | -1980 | -1980 | -1980 | -1980 | -1980 | -1980 | -1980 | -1980 | |
| 2 | 552 | -2490 | -3630 | -1980 | -1980 | -1980 | -1980 | -1980 | -1980 | -1980 | -1980 | -1980 | -1980 | |
| 3 | | 3202 | -3630 | -1980 | -1980 | -1980 | -1980 | -1980 | -1980 | -1980 | -1980 | -1980 | -1980 | |
| 4 | | | 6648 | -1980 | -1980 | -1980 | -1980 | -1980 | -1980 | -1980 | -1980 | -1980 | -1980 | |
| 5 | | | | 10956 | -1980 | -1980 | -1980 | -1980 | -1980 | -1980 | -1980 | -1980 | -1980 | |
| 6 | | | | | 15115 | -1980 | -1980 | -1980 | -1980 | -1980 | -1980 | -1980 | -1980 | |
| 7 | | | | | | 20617 | -1980 | -1980 | -1980 | -1980 | -1980 | -1980 | -1980 | |
| 8 | | | | | | | 21771 | -1980 | -1980 | -1980 | -1980 | -1980 | -1980 | |
| 9 | | | | | | | | 22082 | -1980 | -1980 | -1980 | -1980 | -1980 | |
| 10 | | | | | | | | | 25215 | -1980 | -1980 | -1980 | -1980 | |
| 11 | | | | | | | | | | 36156 | -1980 | -1980 | -1980 | |
| 12 | | | | | | | | | | | 38297 | -1980 | -1980 | |
| 13 | | | | | | | | | | | | 65318 | -1980 | 78731 |
| 14 | | | | | | | | | | | | | | -600 |
| 15 | | | | | | | | | | | | | | -600 |
| 16 | | | | | | | | | | | | | | -600 |
| RATE OF RETURN CALCULATIONS | | | | | | | | | | | | | | |
| cumulative oop investment | 500 | 2990 | 6620 | 8600 | 10580 | 12560 | 14540 | 16520 | 18500 | 20480 | 22460 | 24440 | 26420 | 27020 |
| annual return | 10.40% | 5.26% | -2.69% | 26.98% | 16.84% | 20.60% | -3.66% | -7.03% | 4.79% | 32.95% | 0.42% | 62.17% | 16.99% | 14.44% |
| total return | 10.40% | 7.09% | 0.42% | 27.40% | 42.86% | 64.15% | 49.73% | 33.87% | 36.30% | 76.54% | 70.51% | 167.26% | 198.00% | 236.00% |
| average annual return | 10.40% | 7.83% | 4.32% | 9.99% | 11.36% | 12.90% | 10.53% | 8.34% | 7.94% | 10.45% | 9.53% | 13.92% | 14.16% | 14.18% |
| compound average annual return (CAAR) | 10.40% | 3.55% | 0.14% | 6.85% | 8.57% | 10.69% | 7.10% | 4.21% | 4.03% | 7.65% | 6.41% | 13.94% | 15.23% | 16.86% |
| internal rate of return (IRR) | 10.40% | 6.02% | 0.28% | 11.55% | 13.34% | 15.30% | 10.53% | 6.58% | 6.24% | 10.27% | 8.76% | 14.59% | 14.87% | 14.82% |
| compound average annual return (CAAR) | 10.40% | 3.55% | 0.14% | 6.85% | 8.57% | 10.69% | 7.10% | 4.21% | 4.03% | 7.65% | 6.41% | 13.94% | 15.23% | 16.86% |
| RATE OF RETURN COMPARISONS | | | | | | | | | | | | | | |
| avg annual return minus compound avg annual retur | 0.00% | 4.28% | 4.18% | 3.14% | 2.79% | 2.21% | 3.43% | 4.13% | 3.91% | 2.79% | 3.12% | -0.02% | -1.07% | -2.68% |
| IRR minus compound avg annual return | 0.00% | 2.48% | 0.14% | 4.70% | 4.76% | 4.61% | 3.42% | 2.38% | 2.21% | 2.62% | 2.35% | 0.66% | -0.36% | -2.03% |
| NET PRESENT VALUE CALCULATIONS | | | | | | | | | | | | | | |
| net present value (NPV) | $0 | $82 | $14 | $773 | $1,174 | $1,526 | $1,644 | $1,577 | $1,838 | $2,347 | $2,605 | $603 | ($346) | ($1,905) |
| LOGICAL "AND" FUNCTIONS | | | | | | | | | | | | | | |
| is total return > 0 and CAAR > IRR ? | FALSE | FALSE | FALSE | FALSE | FALSE | FALSE | FALSE | FALSE | FALSE | FALSE | FALSE | FALSE | TRUE | TRUE |
| is total return > 0 and NPV < 0 ? | FALSE | FALSE | FALSE | FALSE | FALSE | FALSE | FALSE | FALSE | FALSE | FALSE | FALSE | FALSE | TRUE | TRUE |
| Stop contributions when result is TRUE | | | | | | | | | | | | | | |

Spreadsheet 1
Fig. 18A

| | | | | | |
|---|---|---|---|---|---|
| 15 | 16 | | | | |
| 600 | 0 | | | | |
| 95000 | 95000 | | | | |

| | |
|---|---|
| 90788 | |
| -600 | 95000 |
| -600 | 0 | 95000 |
| 27620 | 27620 |
| 3.95% | 0.00% |
| 243.95% | 243.95% |
| 13.50% | 12.65% |
| 16.26% | 15.25% |
| 13.74% | 12.46% |
| 16.26% | 15.25% |
| -2.77% | -2.60% |
| -2.52% | -2.79% |
| ($2,585) | ($3,173) |
| TRUE | TRUE |
| TRUE | TRUE |

Spreadsheet 1 (cont.)
Fig. 18B

| | |
|---|---|
| period | 1 |
| yearly out of pocket (oop) investment | 500 |
| year end market value | 552 |

| | |
|---|---|
| 1 | =-B$3 |
| 2 | =-B$3 |
| 3 | =-B$3 |
| 4 | =-B$3 |
| 5 | =-B$3 |
| 6 | =-B$3 |
| 7 | =-B$3 |
| 8 | =-B$3 |
| 9 | =-B$3 |
| 10 | =-B$3 |
| 11 | =-B$3 |
| 12 | =-B$3 |
| 13 | =-B$3 |
| 14 | =-B$3 |
| 15 | =-B$3 |
| 16 | =-B$3 |

| | |
|---|---|
| cumulative oop investment | =B3 |
| annual return | =(B4-B3)/B3 |
| total return | =(B4-B23)/B23 |
| average annual return | =B24/B2 |
| compound average annual return (CAAR) | =B25/B2 |
| internal rate of return (IRR) | =IRR(B6:C6) |
| compound average annual return (CAAR) | =B27 |

| | |
|---|---|
| avg annual return minus compound avg annual return | =B26-B27 |
| IRR minus compound avg annual return | =B28-B27 |

| | |
|---|---|
| net present value (NPV) | =B6+NPV(B27,C6) |

| | |
|---|---|
| is total return > 0 and CAAR > IRR ? | =AND(B25>0,B29>(B28+0.00000001)) |
| is total return > 0 and NPV < 0 ? | =AND(B25>0,B34<0) |

Stop contributions when result is TRUE

Spreadsheet 2
Fig. 19A

| 2 | 3 | 4 | 5 |
|---|---|---|---|
| 2490 | 3630 | 1980 | 1980 |
| 3202 | 6648 | 10956 | 15115 |
| =B4 | | | |
| =-C$3 | =C4 | | |
| =-C$3 | =-D$3 | =D4 | |
| =-C$3 | =-D$3 | =-E$3 | =E4 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =-C$3 | =-D$3 | =-E$3 | =-F$3 |
| =C3+B23 | =D3+C23 | =E3+D23 | =F3+E23 |
| =(C4-(B4+C3))/(B4+C3) | =(D4-(C4+D3))/(C4+D3) | =(E4-(D4+E3))/(D4+E3) | =(F4-(E4+F3))/(E4+F3) |
| =(C4-C23)/C23 | =(D4-D23)/D23 | =(E4-E23)/E23 | =(F4-F23)/F23 |
| =(SUM($B24:C24))/C2 | =(SUM($B24:D24))/D2 | =(SUM($B24:E24))/E2 | =(SUM($B24:F24))/F2 |
| =C25/C2 | =D25/D2 | =E25/E2 | =F25/F2 |
| =IRR(B7:D7) | =IRR(B8:E8) | =IRR(B9:F9) | =IRR(B10:G10) |
| =C27 | =D27 | =E27 | =F27 |
| =C26-C27 | =D26-D27 | =E26-E27 | =F26-F27 |
| =C28-C27 | =D28-D27 | =E28-E27 | =F28-F27 |
| =B7+NPV(C27,C7:D7) | =B8+NPV(D27,C8:E8) | =B9+NPV(E27,C9:F9) | =B10+NPV(F27,C10:G10) |
| =AND(C25>0,C29>C28) | =AND(D25>0,D29>D28) | =AND(E25>0,E29>E28) | =AND(F25>0,F29>F28) |
| =AND(C25>0,C34<0) | =AND(D25>0,D34<0) | =AND(E25>0,E34<0) | =AND(F25>0,F34<0) |

Spreadsheet 2 (cont.)
Fig. 19B

| DATA | | | |
|---|---|---|---|
| 6 | 7 | 8 | 9 |
| 1980 | 1980 | 1980 | 1980 |
| 20617 | 21771 | 22082 | 25215 |

| CASH FLOW CALCULATIONS | | | |
|---|---|---|---|
| =F4 | | | |
| =-G$3 | =G4 | | |
| =-G$3 | =-H$3 | =H4 | |
| =-G$3 | =-H$3 | =-I$3 | =I4 |
| =-G$3 | =-H$3 | =-I$3 | =-J$3 |
| =-G$3 | =-H$3 | =-I$3 | =-J$3 |
| =-G$3 | =-H$3 | =-I$3 | =-J$3 |
| =-G$3 | =-H$3 | =-I$3 | =-J$3 |
| =-G$3 | =-H$3 | =-I$3 | =-J$3 |
| =-G$3 | =-H$3 | =-I$3 | =-J$3 |
| =-G$3 | =-H$3 | =-I$3 | =-J$3 |
| =-G$3 | =-H$3 | =-I$3 | =-J$3 |

| RATE OF RETURN CALCULATIONS | | | |
|---|---|---|---|
| =G3+F23 | =H3+G23 | =I3+H23 | =J3+I23 |
| =(G4-(F4+G3))/(F4+G3) | =(H4-(G4+H3))/(G4+H3) | =(I4-(H4+I3))/(H4+I3) | =(J4-(I4+J3))/(I4+J3) |
| =(G4-G23)/G23 | =(H4-H23)/H23 | =(I4-I23)/I23 | =(J4-J23)/J23 |
| =(SUM($B24:G24))/G2 | =(SUM($B24:H24))/H2 | =(SUM($B24:I24))/I2 | =(SUM($B24:J24))/J2 |
| =G25/G2 | =H25/H2 | =I25/I2 | =J25/J2 |
| =IRR(B11:H11) | =IRR(B12:I12) | =IRR(B13:J13) | =IRR(B14:K14) |
| =G27 | =H27 | =I27 | =J27 |

| RATE OF RETURN COMPARISONS | | | |
|---|---|---|---|
| =G26-G27 | =H26-H27 | =I26-I27 | =J26-J27 |
| =G28-G27 | =H28-H27 | =I28-I27 | =J28-J27 |

| NET PRESENT VALUE CALCULATIONS | | | |
|---|---|---|---|
| =B11+NPV(G27,C11:H11) | =B12+NPV(H27,C12:I12) | =B13+NPV(I27,C13:J13) | =B14+NPV(J27,C14:K14) |

| LOGICAL "AND" FUNCTIONS | | | |
|---|---|---|---|
| =AND(G25>0,G29>G28) | =AND(H25>0,H29>H28) | =AND(I25>0,I29>I28) | =AND(J25>0,J29>J28) |
| =AND(G25>0,G34<0) | =AND(H25>0,H34<0) | =AND(I25>0,I34<0) | =AND(J25>0,J34<0) |

Spreadsheet 2 (cont.)
Fig. 19C

| 10 | 11 | 12 |
|---|---|---|
| 1980 | 1980 | 1980 |
| 36156 | 38297 | 65318 |

| | | |
|---|---|---|
| =J4 | | |
| =-K$3 | =K4 | |
| =-K$3 | =-L$3 | =L4 |
| =-K$3 | =-L$3 | =-M$3 |
| =-K$3 | =-L$3 | =-M$3 |
| =-K$3 | =-L$3 | =-M$3 |
| =-K$3 | =-L$3 | =-M$3 |
| =-K$3 | =-L$3 | =-M$3 |

| | | |
|---|---|---|
| =K3+J23 | =L3+K23 | =M3+L23 |
| =(K4-(J4+K3))/(J4+K3) | =(L4-(K4+L3))/(K4+L3) | =(M4-(L4+M3))/(L4+M3) |
| =(K4-K23)/K23 | =(L4-L23)/L23 | =(M4-M23)/M23 |
| =(SUM($B24:K24))/K2 | =(SUM($B24:L24))/L2 | =(SUM($B24:M24))/M2 |
| =K25/K2 | =L25/L2 | =M25/M2 |
| =IRR(B15:L15) | =IRR(B16:M16) | =IRR(B17:N17) |
| =K27 | =L27 | =M27 |

| | | |
|---|---|---|
| =K26-K27 | =L26-L27 | =M26-M27 |
| =K28-K27 | =L28-L27 | =M28-M27 |

| | | |
|---|---|---|
| =B15+NPV(K27,C15:L15) | =B16+NPV(L27,C16:M16) | =B17+NPV(M27,C17:N17) |

| | | |
|---|---|---|
| =AND(K25>0,K29>K28) | =AND(L25>0,L29>L28) | =AND(M25>0,M29>M28) |
| =AND(K25>0,K34<0) | =AND(L25>0,L34<0) | =AND(M25>0,M34<0) |

Spreadsheet 2 (cont.)
Fig. 19D

| 13 | 14 | 15 |
|---|---|---|
| 1980 | 600 | 600 |
| 78731 | 90788 | 95000 |

| | | |
|---|---|---|
| =M4 | | |
| =-N$3 | =N4 | |
| =-N$3 | =-O$3 | =O4 |
| =-N$3 | =-O$3 | =-P$3 |
| =-N$3 | =-O$3 | =-P$3 |

| | | |
|---|---|---|
| =N3+M23 | =O3+N23 | =P3+O23 |
| =(N4-(M4+N3))/(M4+N3) | =(O4-(N4+O3))/(N4+O3) | =(P4-(O4+P3))/(O4+P3) |
| =(N4-N23)/N23 | =(O4-O23)/O23 | =(P4-P23)/P23 |
| =(SUM($B24:N24))/N2 | =(SUM($B24:O24))/O2 | =(SUM($B24:P24))/P2 |
| =N25/N2 | =O25/O2 | =P25/P2 |
| =IRR(B18:O18) | =IRR(B19:P19) | =IRR(B20:Q20) |
| =N27 | =O27 | =P27 |

| | | |
|---|---|---|
| =N26-N27 | =O26-O27 | =P26-P27 |
| =N28-N27 | =O28-O27 | =P28-P27 |

| | | |
|---|---|---|
| =B18+NPV(N27,C18:O18) | =B19+NPV(O27,C19:P19) | =B20+NPV(P27,C20:Q20) |

| | | |
|---|---|---|
| =AND(N25>0,N29>N28) | =AND(O25>0,O29>O28) | =AND(P25>0,P29>P28) |
| =AND(N25>0,N34<0) | =AND(O25>0,O34<0) | =AND(P25>0,P34<0) |

Spreadsheet 2 (cont.)
Fig. 19E

16
0
95000

=P4
=P5                    =Q4

=Q3+P23
=(Q4-(P4+Q3))/(P4+Q3)
=(Q4-Q23)/Q23
=(SUM($B24:Q24))/Q2
=Q25/Q2
=IRR(B21:R21)
=Q27

=Q26-Q27
=Q28-Q27

=B21+NPV(Q27,C21:R21)

=AND(Q25>0,Q29>Q28)
=AND(Q25>0,Q34<0)

Spreadsheet 2 (cont.)
Fig. 19F

| period | 1 | 2 | 3 | 4 | 5 |
|---|---|---|---|---|---|
| yearly out of pocket (oop) investment | 500 | 2000 | 2750 | 1500 | 1500 |
| year end market value | 498 | 3338 | 5648 | 6910 | 9413 |
| | | | | | CASH |
| 1 | -500 | 498 | | | |
| 2 | -500 | -2000 | 3338 | | |
| 3 | -500 | -2000 | -2750 | 5648 | |
| 4 | -500 | -2000 | -2750 | -1500 | 6910 |
| 5 | -500 | -2000 | -2750 | -1500 | -1500 |
| 6 | -500 | -2000 | -2750 | -1500 | -1500 |
| 7 | -500 | -2000 | -2750 | -1500 | -1500 |
| 8 | -500 | -2000 | -2750 | -1500 | -1500 |
| 9 | -500 | -2000 | -2750 | -1500 | -1500 |
| 10 | -500 | -2000 | -2750 | -1500 | -1500 |
| 11 | -500 | -2000 | -2750 | -1500 | -1500 |
| 12 | -500 | -2000 | -2750 | -1500 | -1500 |
| 13 | -500 | -2000 | -2750 | -1500 | -1500 |
| 14 | -500 | -2000 | -2750 | -1500 | -1500 |
| 15 | -500 | -2000 | -2750 | -1500 | -1500 |
| 16 | -500 | -2000 | -2750 | -1500 | -1500 |
| | | | | | RATE OI |
| cumulative oop investment | 500 | 2500 | 5250 | 6750 | 8250 |
| annual return | -0.40% | 33.63% | -7.23% | -3.33% | 11.93% |
| total return | -0.40% | 33.52% | 7.58% | 2.37% | 14.10% |
| average annual return | -0.40% | 16.61% | 8.67% | 5.67% | 6.92% |
| compound average annual return (CAAR) | -0.40% | 16.76% | 2.53% | 0.59% | 2.82% |
| internal rate of return (IRR) | -0.40% | 26.74% | 4.73% | 1.06% | 4.74% |
| compound average annual return (CAAR) | -0.40% | 16.76% | 2.53% | 0.59% | 2.82% |
| | | | | | RATE O |
| avg annual return minus compound avg annual return | 0.00% | -0.15% | 6.14% | 5.07% | 4.10% |
| IRR minus compound avg annual return | 0.00% | 9.98% | 2.20% | 0.47% | 1.92% |
| | | | | | NET PRES |
| net present value (NPV) | $0 | $236 | $174 | $69 | $423 |
| | | | | | |
| is total return > 0 and CAAR > IRR ? | FALSE | FALSE | FALSE | FALSE | FALSE |
| is total return > 0 and NPV < 0 ? | FALSE | FALSE | FALSE | FALSE | FALSE |

Stop contributions when result is TRUE

Spreadsheet 3
Fig. 20A

| DATA | | | | | | | | |
|---|---|---|---|---|---|---|---|---|
| 6 | 7 | 8 | 9 | 10 | 11 | 12 | 13 | 14 |
| 1500 | 1500 | 1500 | 1500 | 1500 | 1500 | 1500 | 1500 | 1500 |
| 10251 | 12364 | 34387 | 30216 | 24077 | 21550 | 37698 | 48371 | 63645 |
| FLOW CALCULATIONS | | | | | | | | |
| 9413 | | | | | | | | |
| -1500 | 10251 | | | | | | | |
| -1500 | -1500 | 12364 | | | | | | |
| -1500 | -1500 | -1500 | 34387 | | | | | |
| -1500 | -1500 | -1500 | -1500 | 30216 | | | | |
| -1500 | -1500 | -1500 | -1500 | -1500 | 24077 | | | |
| -1500 | -1500 | -1500 | -1500 | -1500 | -1500 | 21550 | | |
| -1500 | -1500 | -1500 | -1500 | -1500 | -1500 | -1500 | 37698 | |
| -1500 | -1500 | -1500 | -1500 | -1500 | -1500 | -1500 | -1500 | 48371 |
| -1500 | -1500 | -1500 | -1500 | -1500 | -1500 | -1500 | -1500 | -1500 |
| -1500 | -1500 | -1500 | -1500 | -1500 | -1500 | -1500 | -1500 | -1500 |
| -1500 | -1500 | -1500 | -1500 | -1500 | -1500 | -1500 | -1500 | -1500 |
| RETURN CALCULATIONS | | | | | | | | |
| 9750 | 11250 | 12750 | 14250 | 15750 | 17250 | 18750 | 20250 | 21750 |
| -6.07% | 5.22% | 148.03% | -15.80% | -24.09% | -15.74% | 63.55% | 23.40% | 27.62% |
| 5.14% | 9.90% | 169.70% | 112.04% | 52.87% | 24.93% | 101.06% | 138.87% | 192.62% |
| 4.76% | 4.82% | 22.72% | 18.44% | 14.19% | 11.47% | 15.81% | 16.39% | 17.19% |
| 0.86% | 1.41% | 21.21% | 12.45% | 5.29% | 2.27% | 8.42% | 10.68% | 13.76% |
| 1.48% | 2.41% | 22.45% | 14.95% | 7.60% | 3.65% | 10.34% | 11.82% | 13.42% |
| 0.86% | 1.41% | 21.21% | 12.45% | 5.29% | 2.27% | 8.42% | 10.68% | 13.76% |
| RETURN COMPARISONS | | | | | | | | |
| 3.90% | 3.41% | 1.51% | 5.99% | 8.90% | 9.20% | 7.39% | 5.71% | 3.44% |
| 0.63% | 0.99% | 1.23% | 2.50% | 2.32% | 1.38% | 1.92% | 1.14% | -0.34% |
| SENT VALUE CALCULATIONS | | | | | | | | |
| $204 | $427 | $384 | $1,242 | $1,754 | $1,370 | $1,770 | $1,069 | ($296) |
| LOGICAL "AND" FUNCTIONS | | | | | | | | |
| FALSE | FALSE | FALSE | FALSE | FALSE | FALSE | FALSE | FALSE | TRUE |
| FALSE | FALSE | FALSE | FALSE | FALSE | FALSE | FALSE | FALSE | TRUE |

Spreadsheet 3 (cont.)
Fig. 20B

|  | 15 | 16 |
|---|---|---|
|  | 1500 | 0 |
|  | 70000 | 70000 |

| 63645 | | |
|---|---|---|
| -1500 | 70000 | |
| -1500 | 0 | 70000 |

| 23250 | 23250 |
|---|---|
| 7.45% | 0.00% |
| 201.08% | 201.08% |
| 16.54% | 15.51% |
| 13.41% | 12.57% |
| 12.82% | 11.59% |
| 13.41% | 12.57% |

| 3.14% | 2.94% |
|---|---|
| -0.59% | -0.98% |

| ($572) | ($11,591) |
|---|---|
| TRUE | TRUE |
| TRUE | TRUE |

Spreadsheet 3 (cont.)
Fig. 20C

| period | 1 | 2 | 3 | 4 | 5 |
|---|---|---|---|---|---|
| yearly out of pocket (oop) investment | 100 | 1600 | 1600 | 600 | 600 |
| year end market value | 97 | 2293 | 4732 | 4161 | 6035 |
| 1 | -100 | 97 | | | |
| 2 | -100 | -1600 | 2293 | | |
| 3 | -100 | -1600 | -1600 | 4732 | |
| 4 | -100 | -1600 | -1600 | -600 | 4161 |
| 5 | -100 | -1600 | -1600 | -600 | -600 |
| 6 | -100 | -1600 | -1600 | -600 | -600 |
| 7 | -100 | -1600 | -1600 | -600 | -600 |
| 8 | -100 | -1600 | -1600 | -600 | -600 |
| 9 | -100 | -1600 | -1600 | -600 | -600 |
| 10 | -100 | -1600 | -1600 | -600 | -600 |
| 11 | -100 | -1600 | -1600 | -600 | -600 |
| 12 | -100 | -1600 | -1600 | -600 | -600 |
| 13 | -100 | -1600 | -1600 | -600 | -600 |
| 14 | -100 | -1600 | -1600 | -600 | -600 |
| 15 | -100 | -1600 | -1600 | -600 | -600 |
| 16 | -100 | -1600 | -1600 | -600 | -600 |
| 17 | -100 | -1600 | -1600 | -600 | -600 |
| 18 | -100 | -1600 | -1600 | -600 | -600 |
| 19 | -100 | -1600 | -1600 | -600 | -600 |
| 20 | -100 | -1600 | -1600 | -600 | -600 |
| 21 | -100 | -1600 | -1600 | -600 | -600 |
| 22 | -100 | -1600 | -1600 | -600 | -600 |
| 23 | -100 | -1600 | -1600 | -600 | -600 |
| 24 | -100 | -1600 | -1600 | -600 | -600 |
| 25 | -100 | -1600 | -1600 | -600 | -600 |
| 26 | -100 | -1600 | -1600 | -600 | -600 |
| cumulative oop investment | 100 | 1700 | 3300 | 3900 | 4500 |
| annual return | -3.31% | 35.15% | 21.56% | -21.96% | 26.75% |
| total return | -3.31% | 34.89% | 43.41% | 6.70% | 34.11% |
| average annual return | -3.31% | 15.92% | 17.80% | 7.86% | 11.64% |
| compound average annual return (CAAR) | -3.31% | 17.44% | 14.47% | 1.68% | 6.82% |
| internal rate of return (IRR) | -3.31% | 32.37% | 25.61% | 2.84% | 10.09% |
| compound average annual return (CAAR) | -3.31% | 17.44% | 14.47% | 1.68% | 6.82% |
| avg annual return minus compound avg annual returr | 0.00% | -1.53% | 3.33% | 6.18% | 4.81% |
| IRR minus compound avg annual return | 0.00% | 14.92% | 11.14% | 1.17% | 3.27% |
| net present value (NPV) | $0 | $200 | $436 | $102 | $386 |
| is total return > 0 and CAAR > IRR ? | FALSE | FALSE | FALSE | FALSE | FALSE |
| is total return > 0 and NPV < 0 ? | FALSE | FALSE | FALSE | FALSE | FALSE |

Stop contributions when result is TRUE

Spreadsheet 4
Fig. 21A

| | | | | | | | DATA | | |
|---|---|---|---|---|---|---|---|---|---|
| 6 | 7 | 8 | 9 | 10 | 11 | 12 | 13 | 14 | |
| 600 | 600 | 600 | 600 | 600 | 400 | 0 | 0 | 0 | |
| 7242 | 8229 | 9940 | 14253 | 16248 | 30874 | 31266 | 38085 | 36707 | |
| | | | | | | CASH | FLOW | CALCULATIONS | |
| 6035 | | | | | | | | |
| -600 | 7242 | | | | | | | |
| -600 | -600 | 8229 | | | | | | |
| -600 | -600 | -600 | 9940 | | | | | |
| -600 | -600 | -600 | -600 | 14253 | | | | |
| -600 | -600 | -600 | -600 | -600 | 16248 | | | |
| -600 | -600 | -600 | -600 | -600 | -400 | 30874 | | |
| -600 | -600 | -600 | -600 | -600 | -400 | 0 | 31266 | |
| -600 | -600 | -600 | -600 | -600 | -400 | 0 | 0 | 38085 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| -600 | -600 | -600 | -600 | -600 | -400 | 0 | 0 | 0 |
| | | | | | | RATE | OF RETURN | CALCULATIONS | |
| 5100 | 5700 | 6300 | 6900 | 7500 | 7900 | 7900 | 7900 | 7900 |
| 9.15% | 4.93% | 12.58% | 35.23% | 9.39% | 85.45% | 1.27% | 21.81% | -3.62% |
| 42.00% | 44.37% | 57.78% | 106.57% | 116.64% | 290.81% | 295.77% | 382.09% | 364.65% |
| 11.22% | 10.32% | 10.61% | 13.34% | 12.95% | 19.54% | 18.02% | 18.31% | 16.74% |
| 7.00% | 6.34% | 7.22% | 11.84% | 11.66% | 26.44% | 24.65% | 29.39% | 26.05% |
| 9.84% | 8.74% | 9.47% | 13.39% | 12.79% | 20.16% | 17.90% | 18.28% | 16.08% |
| 7.00% | 6.34% | 7.22% | 11.84% | 11.66% | 26.44% | 24.65% | 29.39% | 26.05% |
| | | | | | | RATE | OF RETURN | COMPARISONS | |
| 4.22% | 3.99% | 3.38% | 1.50% | 1.28% | -6.90% | -6.63% | -11.08% | -9.30% |
| 2.84% | 2.40% | 2.24% | 1.54% | 1.13% | -6.28% | -6.75% | -11.11% | -9.96% |
| | | | | | | NET | PRESENT VALUE | CALCULATION | |
| $458 | $508 | $579 | $415 | $355 | ($1,211) | ($1,467) | ($2,005) | ($2,142) |
| | | | | | | LOGICAL "AND" | FUNCTIONS | | |
| FALSE | FALSE | FALSE | FALSE | FALSE | TRUE | TRUE | TRUE | TRUE |
| FALSE | FALSE | FALSE | FALSE | FALSE | TRUE | TRUE | TRUE | TRUE |

Spreadsheet 4 (cont.)
Fig. 21B

| 15 | 16 | 17 | 18 | 19 | 20 | 21 | 22 |
|---|---|---|---|---|---|---|---|
| 0 | 0 | 0 | 0 | 0 | 0 | 0 | 0 |
| 50538 | 57536 | 70844 | 95317 | 134838 | 107922 | 92212 | 70869 |

| 36707 | | | | | | | |
|---|---|---|---|---|---|---|---|
| 0 | 50538 | | | | | | |
| 0 | 0 | 57536 | | | | | |
| 0 | 0 | 0 | 70844 | | | | |
| 0 | 0 | 0 | 0 | 95317 | | | |
| 0 | 0 | 0 | 0 | 0 | 134838 | | |
| 0 | 0 | 0 | 0 | 0 | 0 | 107922 | |
| 0 | 0 | 0 | 0 | 0 | 0 | 0 | 92212 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

S

| 7900 | 7900 | 7900 | 7900 | 7900 | 7900 | 7900 | 7900 |
|---|---|---|---|---|---|---|---|
| 37.68% | 13.85% | 23.13% | 34.54% | 41.46% | -19.96% | -14.56% | -23.15% |
| 539.72% | 628.30% | 796.76% | 1106.54% | 1606.81% | 1266.10% | 1067.24% | 797.08% |
| 18.14% | 17.87% | 18.18% | 19.09% | 20.27% | 18.25% | 16.69% | 14.88% |
| 35.98% | 39.27% | 46.87% | 61.47% | 84.57% | 63.31% | 50.82% | 36.23% |
| 17.76% | 17.45% | 17.85% | 18.90% | 20.20% | 17.35% | 15.29% | 12.82% |
| 35.98% | 39.27% | 46.87% | 61.47% | 84.57% | 63.31% | 50.82% | 36.23% |

S

| -17.84% | -21.40% | -28.69% | -42.39% | -64.30% | -45.05% | -34.13% | -21.35% |
|---|---|---|---|---|---|---|---|
| -18.22% | -21.82% | -29.02% | -42.57% | -64.37% | -45.95% | -35.54% | -23.41% |

NS

| ($2,455) | ($2,511) | ($2,390) | ($2,052) | ($1,642) | ($2,021) | ($2,344) | ($2,866) |
|---|---|---|---|---|---|---|---|
| TRUE | TRUE | TRUE | TRUE | TRUE | TRUE | TRUE | TRUE |
| TRUE | TRUE | TRUE | TRUE | TRUE | TRUE | TRUE | TRUE |

Spreadsheet 4 (cont.)
Fig. 21C

| 23 | 24 | 25 | 26 |
|---|---|---|---|
| 0 | 0 | 0 | 0 |
| 89171 | 98707 | 102921 | 102891 |

| | | | | |
|---|---|---|---|---|
| 70869 | | | | |
| 0 | 89171 | | | |
| 0 | 0 | 98707 | | |
| 0 | 0 | 0 | 102921 | |
| 0 | 0 | 0 | 0 | 102891 |
| 7900 | 7900 | 7900 | 7900 | |
| 25.83% | 10.69% | 4.27% | -0.03% | |
| 1028.75% | 1149.46% | 1202.80% | 1202.42% | |
| 15.36% | 15.16% | 14.73% | 14.16% | |
| 44.73% | 47.89% | 48.11% | 46.25% | |
| 13.44% | 13.31% | 12.88% | 12% | |
| 44.73% | 47.89% | 48.11% | 46.25% | 0.00% |
| -29.37% | -32.73% | -33.39% | -32.09% | |
| -31.28% | -34.58% | -35.24% | -33.98% | |
| ($2,553) | ($2,449) | ($2,444) | ($2,510) | |
| TRUE | TRUE | TRUE | TRUE | |
| TRUE | TRUE | TRUE | TRUE | |

Spreadsheet 4 (cont.)
Fig. 21D

| | | | | D. |
|---|---|---|---|---|
| period | 1 | 2 | 3 | 4 |
| yearly out of pocket (oop) investment | 1100 | 1400 | 1200 | 1200 |
| year end market value | 895 | 2153 | 3917 | 6417 |
| | | | CASH | FLOW |
| 1 | -1100 | 895 | | |
| 2 | -1100 | -1400 | 2153 | |
| 3 | -1100 | -1400 | -1200 | 3917 |
| 4 | -1100 | -1400 | -1200 | -1200 |
| 5 | -1100 | -1400 | -1200 | -1200 |
| 6 | -1100 | -1400 | -1200 | -1200 |
| 7 | -1100 | -1400 | -1200 | -1200 |
| 8 | -1100 | -1400 | -1200 | -1200 |
| 9 | -1100 | -1400 | -1200 | -1200 |
| 10 | -1100 | -1400 | -1200 | -1200 |
| 11 | -1100 | -1400 | -1200 | -1200 |
| 12 | -1100 | -1400 | -1200 | -1200 |
| 13 | -1100 | -1400 | -1200 | -1200 |
| | | | RATE OF | RETUR |
| cumulative oop investment | 1100 | 2500 | 3700 | 4900 |
| annual return | -18.64% | -6.19% | 16.82% | 25.41% |
| total return | -18.64% | -13.88% | 5.86% | 30.96% |
| average annual return | -18.64% | -12.41% | -2.67% | 4.35% |
| compound average annual return (CAAR) | -18.64% | -6.94% | 1.95% | 7.74% |
| internal rate of return (IRR) | -18.64% | -9.94% | 2.92% | 11.15% |
| compound average annual return (CAAR) | -18.64% | -6.94% | 1.95% | 7.74% |
| | | | RATE OF | RETUR |
| avg annual return minus compound avg annual return | 0.00% | -5.47% | -4.62% | -3.39% |
| IRR minus compound avg annual return | 0.00% | -3.00% | 0.96% | 3.41% |
| | | | NET PRESENT | VA |
| net present value (NPV) | $0.00 | ($118.31) | $68.39 | $369.69 |
| | | | ABSOLUTE | VALU |
| absolute value of IRR | 18.64% | 9.94% | 2.92% | 11.15% |
| absolute value of compound avg annual return | 18.64% | 6.94% | 1.95% | 7.74% |
| | | | | LOGICA |
| is total return > 0 and CAAR > IRR ? | FALSE | FALSE | FALSE | FALSE |
| is total return > 0 and NPV < 0 ? | FALSE | FALSE | FALSE | FALSE |

Stop contributions when result is TRUE

Spreadsheet 5
Fig. 22A

| ATA | | | | | | | | |
|---|---|---|---|---|---|---|---|---|
| 5 | 6 | 7 | 8 | 9 | 10 | 11 | 12 | 13 |
| 1200 | 1200 | 1200 | 1200 | 1200 | 1200 | 1200 | 1200 | 100 |
| 5104 | 9816 | 9788 | 10962 | 10064 | 17518 | 25781 | 42868 | 48222 |

CALCULATIONS

| | | | | | | | | | |
|---|---|---|---|---|---|---|---|---|---|
| 6417 | | | | | | | | | |
| -1200 | 5104 | | | | | | | | |
| -1200 | -1200 | 9816 | | | | | | | |
| -1200 | -1200 | -1200 | 9788 | | | | | | |
| -1200 | -1200 | -1200 | -1200 | 10962 | | | | | |
| -1200 | -1200 | -1200 | -1200 | -1200 | 10064 | | | | |
| -1200 | -1200 | -1200 | -1200 | -1200 | -1200 | 17518 | | | |
| -1200 | -1200 | -1200 | -1200 | -1200 | -1200 | -1200 | 25781 | | |
| -1200 | -1200 | -1200 | -1200 | -1200 | -1200 | -1200 | -1200 | 42868 | |
| -1200 | -1200 | -1200 | -1200 | -1200 | -1200 | -1200 | -1200 | -100 | 48222 |

RN CALCULATIONS

| | | | | | | | | |
|---|---|---|---|---|---|---|---|---|
| 6100 | 7300 | 8500 | 9700 | 10900 | 12100 | 13300 | 14500 | 14600 |
| -32.99% | 55.71% | -11.15% | -0.24% | -17.25% | 55.52% | 37.73% | 58.88% | 12.23% |
| -16.33% | 34.47% | 15.15% | 13.01% | -7.67% | 44.78% | 93.84% | 195.64% | 230.29% |
| -3.12% | 6.69% | 4.14% | 3.59% | 1.28% | 6.70% | 9.52% | 13.64% | 13.53% |
| -3.27% | 5.74% | 2.16% | 1.63% | -0.85% | 4.48% | 8.53% | 16.30% | 17.71% |
| -5.88% | 8.52% | 3.52% | 2.70% | -1.59% | 6.61% | 10.68% | 15.83% | 15.43% |
| -3.27% | 5.74% | 2.16% | 1.63% | -0.85% | 4.48% | 8.53% | 16.30% | 17.71% |

RN COMPARISONS

| | | | | | | | | |
|---|---|---|---|---|---|---|---|---|
| 0.15% | 0.94% | 1.97% | 1.97% | 2.13% | 2.22% | 0.99% | -2.67% | -4.19% |
| -2.62% | 2.77% | 1.35% | 1.08% | -0.74% | 2.13% | 2.15% | -0.47% | -2.28% |

LUE CALCULATIONS

| | | | | | | | | |
|---|---|---|---|---|---|---|---|---|
| ($500.09) | $641.57 | $445.07 | $458.79 | ($410.75) | $1,281.69 | $1,329.20 | ($235.99) | ($6,931.68) |

JE CALCULATIONS

| | | | | | | | | |
|---|---|---|---|---|---|---|---|---|
| 5.88% | 8.52% | 3.52% | 2.70% | 1.59% | 6.61% | 10.68% | 15.83% | 15.43% |
| 3.27% | 5.74% | 2.16% | 1.63% | 0.85% | 4.48% | 8.53% | 16.30% | 17.71% |

L "AND" FUNCTIONS

| | | | | | | | | |
|---|---|---|---|---|---|---|---|---|
| FALSE | FALSE | FALSE | FALSE | FALSE | FALSE | FALSE | TRUE | TRUE |
| FALSE | FALSE | FALSE | FALSE | FALSE | FALSE | FALSE | TRUE | TRUE |

Spreadsheet 5 (cont.)
Fig. 22B

| | | |
|---|---|---|
| period | 1 | 2 |
| yearly out of pocket (oop) investment | 1100 | 1400 |
| year end market value | 895 | 2153 |

| | | |
|---|---|---|
| 1 | =-B$3 | =B4 |
| 2 | =-B$3 | =-C$3 |
| 3 | =-B$3 | =-C$3 |
| 4 | =-B$3 | =-C$3 |
| 5 | =-B$3 | =-C$3 |
| 6 | =-B$3 | =-C$3 |
| 7 | =-B$3 | =-C$3 |
| 8 | =-B$3 | =-C$3 |
| 9 | =-B$3 | =-C$3 |
| 10 | =-B$3 | =-C$3 |
| 11 | =-B$3 | =-C$3 |
| 12 | =-B$3 | =-C$3 |
| 13 | =-B$3 | =-C$3 |

| | | |
|---|---|---|
| cumulative oop investment | =B3 | =C3+B20 |
| annual return | =(B4-B3)/B3 | =(C4-(B4+C3))/(B4+C3) |
| total return | =(B4-B20)/B20 | =(C4-C20)/C20 |
| average annual return | =B21/B2 | =(SUM($B21:C21))/C2 |
| compound average annual return (CAAR) | =B22/B2 | =C22/C2 |
| internal rate of return (IRR) | =IRR(B6:C6) | =IRR(B7:D7) |
| compound average annual return (CAAR) | =B24 | =C24 |

| | | |
|---|---|---|
| avg annual return minus compound avg annual return | =B23-B24 | =C23-C24 |
| IRR minus compound avg annual return | =B25-B24 | =C25-C24 |

| | | |
|---|---|---|
| net present value (NPV) | =B6+NPV(B24,C6) | =B7+NPV(C24,C7:D7) |

| | | |
|---|---|---|
| absolute value of IRR | =ABS(B25) | =ABS(C25) |
| absolute value of compound avg annual return | =ABS(B26) | =ABS(C26) |

| | | |
|---|---|---|
| is total return > 0 and CAAR > IRR ? | =AND(B22>0,B26>B25) | =AND(C22>0,C26>C25) |
| is total return > 0 and NPV < 0 ? | =AND(B22>0,B31<0) | =AND(C22>0,C31<0) |

Stop contributions when result is TRUE

Spreadsheet 6
Fig. 23A

|  |  |  |  | DATA |
|---|---|---|---|---|
| 3 | 4 | 5 | 6 | |
| 1200 | 1200 | 1200 | 1200 | |
| 3917 | 6417 | 5104 | 9816 | |
|  |  |  |  | CASH FLOW CALCULA |
| =C4 | | | | |
| =-D$3 | =D4 | | | |
| =-D$3 | =-E$3 | =E4 | | |
| =-D$3 | =-E$3 | =-F$3 | =F4 | |
| =-D$3 | =-E$3 | =-F$3 | =-G$3 | |
| =-D$3 | =-E$3 | =-F$3 | =-G$3 | |
| =-D$3 | =-E$3 | =-F$3 | =-G$3 | |
| =-D$3 | =-E$3 | =-F$3 | =-G$3 | |
| =-D$3 | =-E$3 | =-F$3 | =-G$3 | |
| =-D$3 | =-E$3 | =-F$3 | =-G$3 | |
| =-D$3 | =-E$3 | =-F$3 | =-G$3 | |
| =-D$3 | =-E$3 | =-F$3 | =-G$3 | |
|  |  |  | RATE OF RETURN CALCU | |
| =D3+C20 | =E3+D20 | =F3+E20 | =G3+F20 | |
| =(D4-(C4+D3))/(C4+D3) | =(E4-(D4+E3))/(D4+E3) | =(F4-(E4+F3))/(E4+F3) | =(G4-(F4+G3))/(F4+G3) | |
| =(D4-D20)/D20 | =(E4-E20)/E20 | =(F4-F20)/F20 | =(G4-G20)/G20 | |
| =(SUM($B21:D21))/D2 | =(SUM($B21:E21))/E2 | =(SUM($B21:F21))/F2 | =(SUM($B21:G21))/G2 | |
| =D22/D2 | =E22/E2 | =F22/F2 | =G22/G2 | |
| =IRR(B8:E8) | =IRR(B9:F9) | =IRR(B10:G10) | =IRR(B11:H11) | |
| =D24 | =E24 | =F24 | =G24 | |
|  |  |  | RATE OF RETURN COMPA | |
| =D23-D24 | =E23-E24 | =F23-F24 | =G23-G24 | |
| =D25-D24 | =E25-E24 | =F25-F24 | =G25-G24 | |
|  |  |  | NET PRESENT VALUE CALC | |
| =B8+NPV(D24,C8:E8) | =B9+NPV(E24,C9:F9) | =B10+NPV(F24,C10:G10) | =B11+NPV(G24,C11:H11) | |
|  |  |  | ABSOLUTE VALUE CALCU | |
| =ABS(D25) | =ABS(E25) | =ABS(F25) | =ABS(G25) | |
| =ABS(D26) | =ABS(E26) | =ABS(F26) | =ABS(G26) | |
|  |  |  | LOGICAL "AND" FUN | |
| =AND(D22>0,D26>D25) | =AND(E22>0,E26>E25) | =AND(F22>0,F26>F25) | =AND(G22>0,G26>G25) | |
| =AND(D22>0,D31<0) | =AND(E22>0,E31<0) | =AND(F22>0,F31<0) | =AND(G22>0,G31<0) | |

Spreadsheet 6 (cont.)
Fig. 23B

| 7 | 8 | 9 | 10 |
|---|---|---|---|
| 1200 | 1200 | 1200 | 1200 |
| 9788 | 10962 | 10064 | 17518 |

TIONS

| | | | |
|---|---|---|---|
| =G4 | | | |
| =-H$3 | =H4 | | |
| =-H$3 | =-I$3 | =I4 | |
| =-H$3 | =-I$3 | =-J$3 | =J4 |
| =-H$3 | =-I$3 | =-J$3 | =-K$3 |
| =-H$3 | =-I$3 | =-J$3 | =-K$3 |
| =-H$3 | =-I$3 | =-J$3 | =-K$3 |
| =-H$3 | =-I$3 | =-J$3 | =-K$3 |

LATIONS

| | | | |
|---|---|---|---|
| =H3+G20 | =I3+H20 | =J3+I20 | =K3+J20 |
| =(H4-(G4+H3))/(G4+H3) | =(I4-(H4+I3))/(H4+I3) | =(J4-(I4+J3))/(I4+J3) | =(K4-(J4+K3))/(J4+K3) |
| =(H4-H20)/H20 | =(I4-I20)/I20 | =(J4-J20)/J20 | =(K4-K20)/K20 |
| =(SUM($B21:H21))/H2 | =(SUM($B21:I21))/I2 | =(SUM($B21:J21))/J2 | =(SUM($B21:K21))/K2 |
| =H22/H2 | =I22/I2 | =J22/J2 | =K22/K2 |
| =IRR(B12:I12) | =IRR(B13:J13) | =IRR(B14:K14) | =IRR(B15:L15) |
| =H24 | =I24 | =J24 | =K24 |

ARISONS

| | | | |
|---|---|---|---|
| =H23-H24 | =I23-I24 | =J23-J24 | =K23-K24 |
| =H25-H24 | =I25-I24 | =J25-J24 | =K25-K24 |

:ULATIONS

| | | | |
|---|---|---|---|
| =B12+NPV(H24,C12:I12) | =B13+NPV(I24,C13:J13) | =B14+NPV(J24,C14:K14) | =B15+NPV(K24,C15:L15) |

LATIONS

| | | | |
|---|---|---|---|
| =ABS(H25) | =ABS(I25) | =ABS(J25) | =ABS(K25) |
| =ABS(H26) | =ABS(I26) | =ABS(J26) | =ABS(K26) |

ICTIONS

| | | | |
|---|---|---|---|
| =AND(H22>0,H26>H25) | =AND(I22>0,I26>I25) | =AND(J22>0,J26>J25) | =AND(K22>0,K26>K25) |
| =AND(H22>0,H31<0) | =AND(I22>0,I31<0) | =AND(J22>0,J31<0) | =AND(K22>0,K31<0) |

Spreadsheet 6 (cont.)
Fig. 23C

| 11 | 12 | 13 |
|----|----|----|
| 1200 | 1200 | 100 |
| 25781 | 42868 | 48222 |

| | | | |
|---|---|---|---|
| =K4 | | | |
| =-L$3 | =L4 | | |
| =-L$3 | =-M$3 | =M4 | |
| =-L$3 | =-M$3 | =-N$3 | =N4 |

| | | |
|---|---|---|
| =L3+K20 | =M3+L20 | =N3+M20 |
| =(L4-(K4+L3))/(K4+L3) | =(M4-(L4+M3))/(L4+M3) | =(N4-(M4+N3))/(M4+N3) |
| =(L4-L20)/L20 | =(M4-M20)/M20 | =(N4-N20)/N20 |
| =(SUM($B21:L21))/L2 | =(SUM($B21:M21))/M2 | =(SUM($B21:N21))/N2 |
| =L22/L2 | =M22/M2 | =N22/N2 |
| =IRR(B16:M16) | =IRR(B17:N17) | =IRR(B18:O18) |
| =L24 | =M24 | =N24 |

| | | |
|---|---|---|
| =L23-L24 | =M23-M24 | =N23-N24 |
| =L25-L24 | =M25-M24 | =N25-N24 |

| | | |
|---|---|---|
| =B16+NPV(L24,C16:M16) | =B17+NPV(M24,C17:N17) | =B18+NPV(N24,C18:N18) |

| | | |
|---|---|---|
| =ABS(L25) | =ABS(M25) | =ABS(N25) |
| =ABS(L26) | =ABS(M26) | =ABS(N26) |

| | | |
|---|---|---|
| =AND(L22>0,L26>L25) | =AND(M22>0,M26>M25) | =AND(N22>0,N26>N25) |
| =AND(L22>0,L31<0) | =AND(M22>0,M31<0) | =AND(N22>0,N31<0) |

Spreadsheet 6 (cont.)
Fig. 23D

ARTICLE OF MANUFACTURE FOR MANAGING RETIREMENT AND OTHER INVESTMENTS THAT USE AN ASSET ACCUMULATION STRATEGY

CROSS-REFERENCE TO RELATED APPLICATIONS

This application is a continuation of U.S. application Ser. No. 11/688,383 filed Mar. 20, 2007, which is incorporated herein by reference.

This application claims the benefit of U.S. Provisional Application No. 60/872,686 filed Dec. 4, 2006.

BACKGROUND OF THE INVENTION

Dollar cost averaging (DCA) is a strategy used for accumulating assets, usually shares of common stock and mutual funds (both stock and bond funds). The strategy calls for the investment of a fixed dollar amount on a periodic basis. An example of this would be investing $100.00 per month in a mutual fund. This is a strategy that is built into 401K and other retirement plans funded through automatic periodic deductions from pay. Some benefits of such a strategy are as follows:

1. Convenience—it is easy to plan for investment. Many banks and mutual fund companies allow an automatic disbursement from a checking account to the fund. Retirement plans make automatic deductions from pay.
2. Introduction to investing—dollars for a lump sum investment may not be available. For someone who is just starting to invest, this may be all that can be afforded.
3. Averaging share cost—by investing a fixed sum periodically, the number of shares acquired at any given time will be based on the share price. If the share price has risen, fewer shares will be purchased. If the share price has decreased, more shares will be purchased. Over time, it is the purchases made when prices are lower that reduces the average cost of the shares. If the share price was to subsequently rise, greater capital gains would be obtained. This strategy may make more sense using mutual funds than individual stock because if an individual company fails, the share price may never recover. In contrast, if a company held by a mutual fund fails, the fund share price would be less impacted.
4. Time value of money—a dollar received today is worth more than a dollar received next year because today's dollar can be invested and earn interest so that a year from now, its value will be 1+(i/100%), where i=the annual percent interest rate earned. Consider two separate investments of $1000, each equaling $2000 in seven years. If investment A required payment of the $1000 at the beginning but investment B allowed periodic monthly payment over the seven years, investment B would be preferred because the amount of the $1000 not yet invested could be earning interest.

It may be perceived that this periodic investment should go on forever with the investor adding to the amount of investment over time as income increases. The latter actually happens automatically in retirement plans that are based on a percentage of pay, every time pay is increased. Many financial websites extol the virtues of dollar cost averaging and even provide tools that may be used to simulate returns based on the amount invested and various share prices. The same is true for retirement plans.

BRIEF SUMMARY OF THE INVENTION

In one preferred embodiment of the present invention, an article of manufacture is provided to make decisions regarding funding additional contributions to an investment that is funded using an asset accumulation strategy. A data processor automatically determines an absolute value of a compound average annual rate of return of the investment for a plurality of successive time instances, and an absolute value of an internal rate of return of the investment for a plurality of successive time instances. A first time instance is then identified when the absolute value of the compound average annual rate of return of the investment exceeds the absolute value of the internal rate of return of the investment. The first time instance represents the time in which it is recommended that funding of additional contributions to the investment should be stopped.

In another preferred embodiment of the present invention, an article of manufacture is provided to make decisions regarding funding additional contributions to an investment that is funded using an asset accumulation strategy. A data processor automatically determines a compound average annual rate of return of the investment for a plurality of successive time instances, an internal rate of return of the investment for a plurality of successive time instances, and a total return of the investment for a plurality of successive time instances. A first time instance is then identified when the compound average annual rate of return of the investment exceeds the internal rate of return of the investment and when the total return is greater than zero. The first time instance represents the time in which it is recommended that funding of additional contributions to the investment should be stopped.

In another preferred embodiment of the present invention, an article of manufacture is provided of making decisions regarding funding additional contributions to an investment that is funded using an asset accumulation strategy. A data processor automatically determines a compound average annual rate of return of the investment for a plurality of successive time instances. The compound average annual rate of return of the investment is used as a discount rate in calculating a net present value of the investment at a plurality of successive time instances. The data processor also automatically determines a net present value of the investment and a total return of the investment for a plurality of successive time instances. A first time instance is then identified when the net present value of the investment is less than zero and the total return of the investment is greater than zero. The first time instance represents the time in which it is recommended that funding of additional contributions to the investment should be stopped.

BRIEF DESCRIPTION OF THE DRAWINGS

The following drawings provide examples of the invention. However, the invention is not limited to the precise arrangements, instrumentalities, scales, and dimensions shown in these examples, which are provided mainly for illustration purposes only. In the drawings:

FIG. 1 shows a graph of the average annual returns and the compound average annual returns for fund #1 over time.

FIG. 2 shows a graph of the internal rate of return (IRR) and the compound average annual returns for fund #1 over time.

FIG. 3 shows a graph of return differences. It shows the average annual returns minus the compound average annual returns and the internal rate of return (IRR) minus the compound average annual returns for fund #1 over time.

FIG. 4 shows a graph of the net present value (NPV) of fund #1 over time.

FIG. 5 shows a graph of the average annual returns and the compound average annual returns for fund #2 over time.

FIG. 6 shows a graph of the internal rate of return (IRR) and the compound average annual returns for fund #2 over time.

FIG. 7 shows a graph of return differences. It shows the average annual returns minus the compound average annual returns and the internal rate of return (IRR) minus the compound average annual returns for fund #2 over time.

FIG. 8 shows a graph of the net present value (NPV) of fund #2 over time.

FIG. 9 shows a graph of the average annual returns and the compound average annual returns for fund #3 over time.

FIG. 10 shows a graph of the internal rate of return (IRR) and the compound average annual returns for fund #3 over time.

FIG. 11 shows a graph of return differences. It shows the average annual returns minus the compound average annual returns and the internal rate of return (IRR) minus the compound average annual returns for fund #3 over time.

FIG. 12 shows a graph of the net present value (NPV) of fund #3 over time.

FIG. 13 shows a graph of the average annual returns and the compound average annual returns for fund #4 over time.

FIG. 14 shows a graph of the internal rate of return (IRR) and the compound average annual returns for fund #4 over time.

FIG. 15 shows a graph of return differences. It shows the average annual returns minus the compound average annual returns and the internal rate of return (IRR) minus the compound average annual returns for fund #4 over time.

FIG. 16 shows a graph of the net present value (NPV) of fund #4 over time.

FIG. 17 shows a graph of the absolute value of the internal rate of return (IRR) and the absolute value of the compound average annual returns for fund #4 over time.

FIGS. 18A-18B, taken together, form Spreadsheet 1 which shows the data and results of the calculations for fund #1.

FIGS. 19A-19F, taken together, form Spreadsheet 2 which shows the formulas used in the calculations performed on Spreadsheet 1. It is a template of the formulas used in the analysis of all funds included in the present invention.

FIGS. 20A-20C, taken together, form Spreadsheet 3 which shows the data and results of the calculations for fund #2.

FIGS. 21A-21D, taken together, form Spreadsheet 4 which shows the data and results of the calculations for fund #3.

FIGS. 22A-22B, taken together, form Spreadsheet 5 which shows the data and results of the calculations for fund #4.

FIGS. 23A-23D, taken together, form Spreadsheet 6 which shows the formulas used in the calculations performed on Spreadsheet 4. It is the same template of the formulas used in the analysis of the other funds except it additionally includes the calculations for the absolute value of the IRR and compound average annual returns for fund #4.

DETAILED DESCRIPTION OF THE INVENTION

I. Overview of Present Invention

Figure 24:
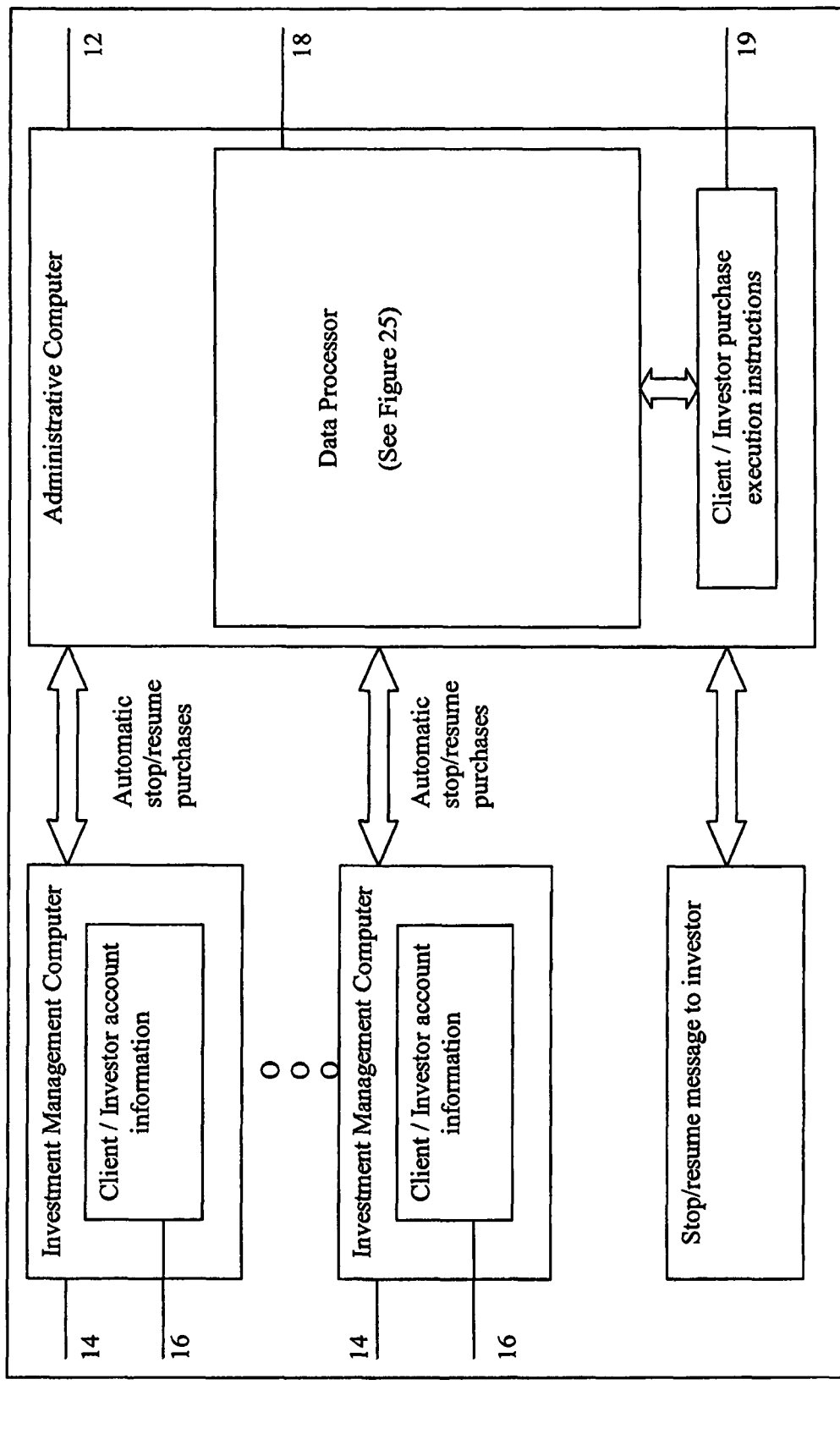
FIGS. 24 and 25 are block diagrams of one preferred embodiment of a system for implementing the present invention.

The present invention uses a comparison of the returns of a single investment to determine how long the periodic contributions should continue and whether they should start up again after being stopped. Positive returns are generated by a DCA strategy when purchases are made at prices lower than a sell price. Over time, accumulation of shares in a stock or fund should result in an asset value that no longer is affected by the periodic contributions. The size of the asset becomes so large that the small periodic investment regardless of the purchase price has minimal effect on the rate of return. This happens when the compound average annual rate of return of the investment exceeds the Internal Rate of Return (IRR). At this point, the return comparison is telling the investor that the time value of money contribution to the investment return is ending, future contributions should be terminated and the investor should start over with a new fund/investment. This allows for greater diversification and another round of time value of money benefits. Clearly, the point is not to stop investing but to reallocate the investments into another fund.

These comparisons are best shown by plotting the annual returns and identifying crossover points. The Table below identifies the type of data and calculations used in the development of the present invention.

TABLE

|  | Period | | | | | |
| --- | --- | --- | --- | --- | --- | --- |
|  | 1 | 2 | 3 | 4 | 5 | 6 |
| yearly out of pocket investment | 100 | 1600 | 1600 | 600 | 600 | 600 |
| cumulative OOP investment | 100 | 1700 | 3300 | 3900 | 4500 | 5100 |
| year end market value | 97 | 2293 | 4732 | 4161 | 6035 | 7242 |
| annual return | −3.31% | 35.15% | 21.56% | −21.96% | 26.75% | 9.15% |
| total return | −3.31% | 34.89% | 43.41% | 6.70% | 34.11% | 42.00% |
| average annual return | −3.31% | 15.92% | 17.80% | 7.86% | 11.64% | 11.22% |
| compound average annual return | −3.31% | 17.44% | 14.47% | 1.68% | 6.82% | 7.00% |
| IRR | −3.31% | 32.37% | 25.61% | 2.84% | 10.09% | 9.84% |

Period=the number of time periods. In this case, it is the number of years.

Yearly out of pocket (OOP) investment=the amount of money that was added to the investment in the time period. It does not include reinvested dividends or capital gains.

Cumulative OOP investment=the sum of the yearly OOP investment over the investment's lifetime.

Year end market value=the market value of the investment at the end of the year. It includes all reinvested dividends and capital gains. Because of ease of reporting, the calendar year was used here and in all other examples. However, any fiscal year end could also be used. In fact, the tool can be used anytime throughout the year provided that the appropriate adjustments are made.

Annual return=the percent return on the investment over a single time period calculated as follows:

Year end market value minus the sum of previous year end market value plus yearly OOP investment all divided by the sum of previous year end market value plus yearly OOP investment. For period 6 in the Table:

The annual return=(7242−(6035+600))/(6035+600)=607/6635=0.0915=9.15%

Total return=the percent return on the investment from its beginning to the time period in question calculated as follows:

Year end market value minus the cumulative OOP investment divided by the cumulative OOP investment. For period 6 in the Table:

The total return=(7242−5100)/5100=0.42=42%

Average annual return=the average of the individual annual returns calculated as follows:

The sum of the individual annual returns divided by the number of periods. For period 6 in the Table:

Average annual return=(−3.31%+35.15%+21.56%−21.96%+26.75%+9.15%)/6=67.34%/6=11.22%

Compound average annual return=the average of the total return for a given period calculated as follows:

The total return for a given period divided by the period number. For period 6 in the Table:

Compound average annual return=42%/6=7%

IRR (internal rate of return)=the rate of discount which makes the net present value (NPV) equal to zero. The solution is usually determined by trial and error and for this reason computer programs or special functions in computer spreadsheets are normally used. For reference purposes formulas are shown below:

$NPV = C0 + C1/(1+IRR) + C2/(1+IRR)^2 + \ldots + Ct/(1+IRR)^t = 0$

C0=initial cash flow (in or out). For the purposes of the present invention, it is the initial period OOP investment. It is negative because it is an outflow.

C1=OOP contribution in period 2.

C2=OOP contribution in period 3.

Ct=Year end market value in last time period. It should be a positive number because it is an inflow.

t=Number of time periods

Net Present Value (NPV) can be used instead of IRR and the decision indicator is when the NPV curve crosses zero (becomes negative). The discount rate used in each periodic calculation is the compounded average annual return for that time period. These results compared favorably to the IRR but may be slightly different because of the way they are calculated. One advantage of using NPV is that if there have been outflows from the investment, then there are more than two sign changes. This could give misleading results using IRR.

Use of the IRR and NPV calculations take into account the time value of money and the share prices of buying and selling. The compound average annual return also takes into account the buy and sell prices but completely excludes the time value of money, assuming that the entire amount invested was contributed at the beginning. The difference between these two calculations results in the value of the time element of the investment. When the compound average annual return exceeds the IRR (or when the NPV is negative), the time value benefit has been exhausted. This signals the investor to reallocate the periodic contributions to another investment.

If returns are negative during the investment lifetime, there may be negative (invalid) crossover points. These could be eliminated by using the absolute value of the return calculations or only accepting crossovers if they occur in a time period in which the total return is positive. However, depending on the type and life of the investment, being aware of these points could help the investor.

The average annual return is the average of the separately calculated annual returns. Since each annual return calculation includes the out of pocket contribution during the year, which is a negative cash flow, it captures some of the time value. That is why the average annual return somewhat tracks the IRR. Therefore, the present invention could also use a comparison of the average annual return with the compounded average annual return to determine when contributions should cease. However, as shown later, this method identifies more invalid crossover points, may miss valid ones and should not be used.

Figure 25:
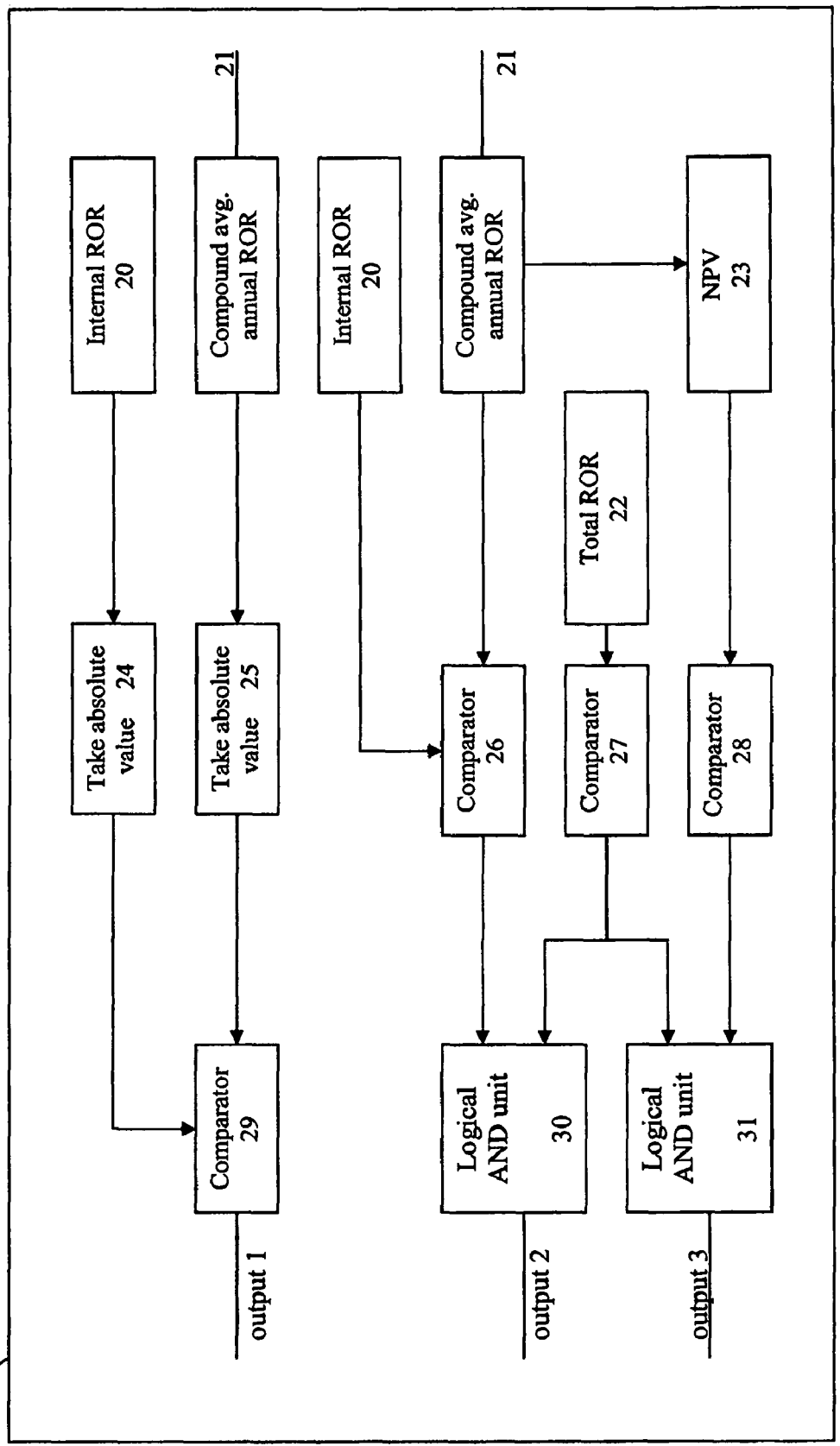

FIG. 24 shows a block diagram of a system 10 for implementing the present invention. The system 10 includes one or more administrative computers 12 and one or more investment management computers 14. (Only one administrative computer 12 is shown in FIG. 24.) Each investment management computer 14 includes client/investor account information 16. Each investment management computer 14 may be associated with an investment company or other type of investment entity. Each investment management computer 14 is in communication with one or more of the administrative computers 12. Each administrative computer 12 includes a data processor 18 and client/investor purchase execution instructions 19. The data processor 18 receives the client/investor account information 16 which constitutes the "investment," and periodically calculates various items related to the investment as shown in FIG. 25, such as internal rate of return (ROR) 20, compound average annual ROR 21, total ROR 22, and NPV 23. The data processor 18 also includes the functionality to take the absolute value 24 and 25 of the internal and compound average annual RORs respectively. These two outputs are then compared in comparator 29 so as to determine when investments should be stopped. Comparator 26 is used for making the appropriate comparisons between the internal ROR 20 and the compound average annual ROR 21. Comparator 27 is used to compare the total ROR 22 to zero. The outputs from these two comparators 26 and 27 is then analyzed in a logical AND unit 30 so as to determine when investments should be stopped. Comparator 28 is used to compare the NPV to zero. Logical AND unit 31 analyzes the outputs from comparators 27 and 28 to determine when investments should be stopped. The client/investor purchase execution instructions 19 include information such as the amount of the dollar cost averaging investment, and the conditions for determining whether to stop making investments. As long as no such conditions have occurred, investments are periodically made according to the dollar cost averaging amounts in instructions 19.

In one preferred embodiment of the present invention, the contributions to an investment are started and stopped automatically based on instructions output from the administrative computers 12. If a particular investment is stopped, the investor may pre-designate an alternative investment to receive new contributions, such as the monthly contributions within a 401(k) plan, or the investment may stop altogether.

In another preferred embodiment, investments are not automatically started or stopped. Instead, the administrative computers 12 send messages to investors informing them of the detected start/stop conditions, and the investors have the option of acting on the messages by sending instructions to the administrative computers 12 to stop making contributions to an investment, or to restart making contributions to an investment that was previously stopped.

In one preferred embodiment of the present invention, the elements and functions of the administrative computer 12 are located in, and performed directly by a financial entity such as a 401(k) administrator, with the assistance of a software program. In another preferred embodiment of the present invention, the elements and functions of the administrative computer 12 are located in, and performed directly by the investor with the assistance of a software program. Alternatively, some or all of the elements and functions of the administrative computer 12 may be located in, and performed directly by, the one or more investment management computers 14. The software programs may be standalone or integrated with other software. They may be made available via hard medium such as Computer Discs (CDs), or via internet downloads. They may also be web-based programs.

Systems for processing and managing investments are well-known in the art, and thus are not described in further detail herein. For example, U.S. Pat. No. 6,014,642 (El-Kadi et al.) discloses a system for benefits processing that may implement the investment management computer 14. U.S. Pat. No. 5,193,056 (Boes) discloses a data processing system for an investment company that may implement the investment management computer 14. U.S. Pat. No. 5,819,238 (Fernholz) discloses apparatus and methods for executing trades associated with buying and selling securities that may implement purchase instructions 19. Each of these patents is incorporated by reference herein.

Such a tool is valuable to independent investors, financial planners, mutual fund companies, banks, 401(k) and other retirement plan custodians and administrators, asset managers, brokerage firms, insurance companies, stock and fund transfer agents, financial websites, web portals, and the like. It may be marketed and sold to individuals, the makers of financial planning software (e.g., Microsoft, Intuit), and various financial service companies described above. It may be added to the websites of financial service companies and others as a standalone tool or integrated with dollar cost averaging and/or other asset accumulation strategy simulation tools and other software.

Figure 26:
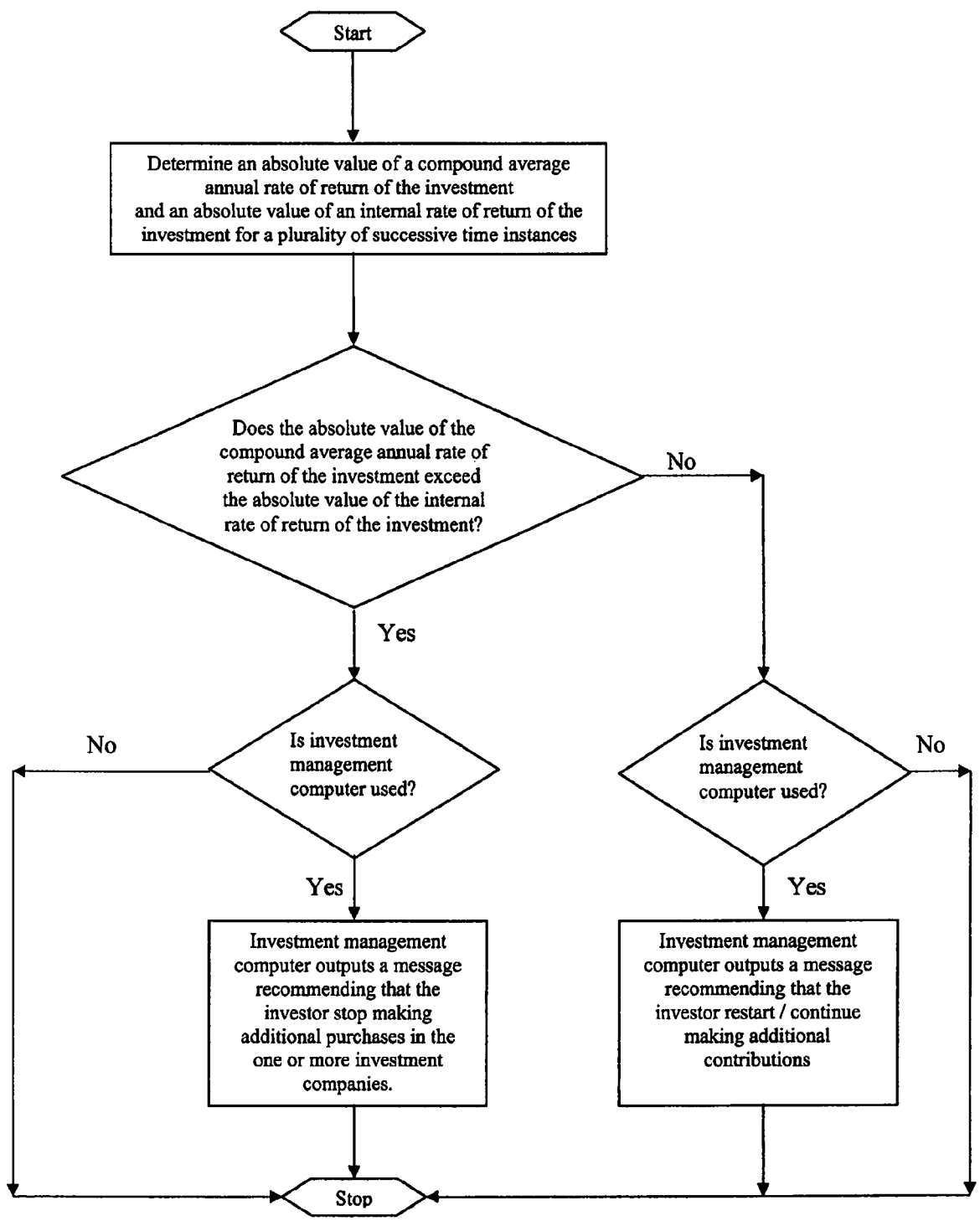
FIGS. 26-28 are flowcharts of preferred embodiments of methods for implementing the present invention.
Figure 27:
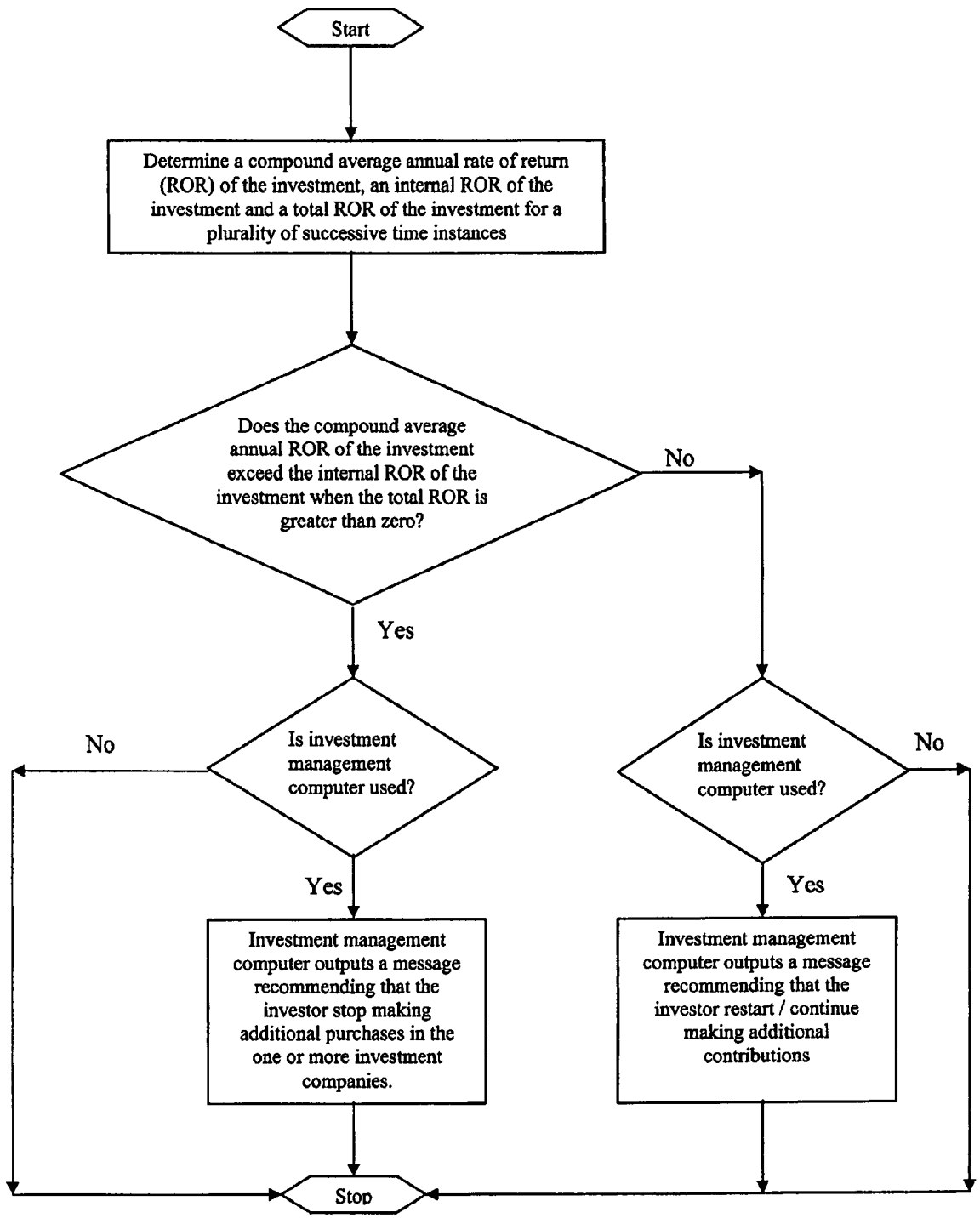
Figure 28:
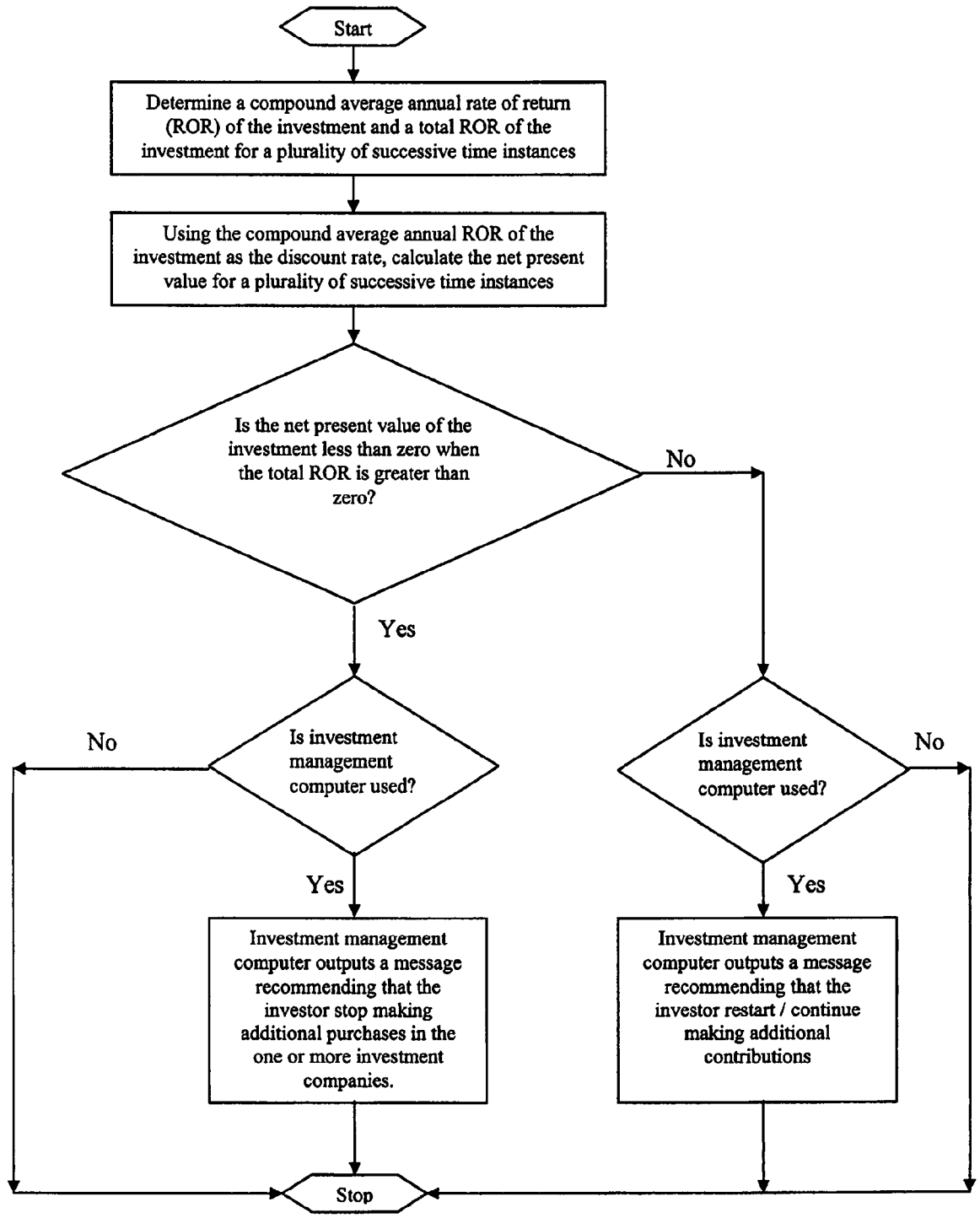

FIGS. 26-28 are self-explanatory flowcharts of preferred embodiments of methods for implementing the present invention. The flowchart steps shown in FIGS. 26-28 may be performed at periodic intervals, such as once per year, to determine if investments should be stopped, restarted, or stopped again. By periodically performing the steps, an investor will have numerous opportunities to receive the recommended investment advice. For example, if the process indicates that contributions should be stopped but an investor decides not to stop making contributions, the process can be repeated the following year. If the same conditions exist, the investor will be informed again that contributions should be stopped.

II. Detailed Disclosure

FIGS. 1-23D provide examples that illustrate the invention details described above for four sample funds.

FIG. 1 shows a graph of the average annual returns and the compound average annual returns for fund #1 over time. When viewed in this way, year 12 identifies a crossover point and signals the investor that the time value element has been exhausted and reallocation of the periodic investments should be considered. FIG. 2 shows a graph of the internal rate of return (IRR) and the compound average annual returns for fund #1 over time. Note that the crossover point using the IRR doesn't occur until year 13. The differences between the use of the average annual returns and the IRR for determining the time value element can be seen in FIG. 3. This graph shows the average annual returns minus the compound average annual returns and the internal rate of return (IRR) minus the compound average annual returns for fund #1 over time. The above crossover point equivalent is when the differences become negative. This occurs in year 12 for the average annual return and year 13 for the IRR.

FIG. 4 shows a graph of the net present value (NPV) of fund #1 over time. The equivalent to the above crossover point is when the NPV becomes negative. This also occurs in year 13 and compares favorably with the use of the IRR.

FIG. 5 shows a graph of the average annual returns and the compound average annual returns for fund #2 over time. A crossover point is identified in year 2 but it clearly does not signal the investor to stop the contributions. At this point in time the asset size is not large enough, when compared to the contributions, to stop. This type of false indicator may occur following a sign change in the total return calculation. It tends to happen early in the investment lifetime. It is not abnormal. However, it is advantageous to monitor the investment because if it persists or shows up again after a number of years it may signal the investor to sell the position. It is telling the investor that more money has been put in than what can be taken out and unless comparison indices show the same results, the fund selected is a poor performer. This may be acceptable to the investor, especially if the fund provides a hedge against a certain situation or if it is not diversified. It may be geographically or industry specific. This is why it is important that the investor know what he or she is invested in and why. According to FIG. 5, no meaningful crossover point occurs and the investor should continue with the yearly out of pocket contributions.

FIG. 6 shows a graph of the internal rate of return (IRR) and the compound average annual returns for fund #2 over time. Note that a crossover point is reached at year 14. This is shown again in FIG. 7 which plots the differences between the use of the average annual returns and the IRR for determining the time value element. The average annual returns show a false positive in year 2 and nothing following, while the IRR shows a crossover in year 14. FIG. 8 confirms the crossover at year 14 by use of the NPV calculation. These figures illustrate that IRR and NPV calculations are better tools for determining the time value element of an investment than using the average annual returns. Final confirmation of a crossover point can be made by a sanity check. The investment has been funded for 14 years. The monthly contributions are $125 and the market value is $63,645. Asset size is large compared to the contributions. It is reasonable to believe that the $125 contributions no longer have a time element of value.

FIG. 9 shows a graph of the average annual returns and the compound average annual returns for fund #3 over time. A crossover point is identified in year 3 but it clearly does not signal the investor to stop the contributions. This is similar to the situation shown in FIG. 5. However, unlike FIG. 5, a legitimate crossover point is shown to occur in year 11. This is confirmed in FIG. 10 showing the IRR and the compound average annual return, FIG. 11 showing the average annual returns minus the compound average annual returns and the internal rate of return (IRR) minus the compound average annual returns, and FIG. 12 showing a graph of the net present value (NPV) of fund #3 over time.

FIG. 13 shows a graph of the average annual returns and the compound average annual returns for fund #4 over time. This fund happens to be geographically specific and is very volatile. A crossover point is identified in year 5 but it clearly does not signal the investor to stop the contributions. This is similar to the situations shown in FIG. 5 and FIG. 9. A legitimate crossover point is shown to occur in year 12.

As shown in FIGS. 22A-22B, there are four time periods in which the total return is negative (time periods 1, 2, 5, 9). These four periods where the cumulative out of pocket investment is greater than the year end market value result in five total return sign changes occurring in time periods 3, 5, 6, 9 and 10. FIG. 14 showing the IRR and the compound average annual returns for fund #4 identifies five crossover points as a result of the five sign changes. Additionally a sixth crossover point is identified. Only the sixth one in year 12 is legitimate. Note that after nine years of investment, the year end market value of this fund was less than the out of pocket contributions. Generally this would cause the investor to consider selling the investment. Knowing the limitations and specifics of the fund allowed the investor to continue with contributions until year 12. The multiple crossover points are identified in FIG. 15 which shows the average annual returns minus the compound average annual returns and the IRR minus the compound average annual returns. These points are confirmed in FIG. 16 which shows the NPV of fund #4 over time.

The false indicators are generated when the year end market value is less than the cumulative out of pocket contributions, when the total return is negative. It is the changing of the sign from positive to negative and vice-versa that generates the crossover points. They can be eliminated by taking the absolute value of the average annual returns or the IRR and the compound average annual returns. This is demonstrated in FIG. 17.

FIGS. 18A-18B: Spreadsheet 1—fund #1 shows the following information:

a. Data Section—this section includes the time period, the out of pocket annual contributions and the end of period market value of the investment. The spreadsheet is set up with time periods 1-26 used as headings for 26 columns, occupying row one. In the next two rows, each time period then has a value for the out of pocket annual contributions and the end of period market value.

b. Cash Flow Calculations—in order to use the IRR and NPV functions built into Microsoft® Excel®, the cash flows (in and out) need to be in the same row or column. This section simply moves the yearly out of pocket investment and year end market values for each time period to a single row.

c. Rate of Return Calculations—this section includes the calculations needed for determining the various investment rates of return. Each column has an entry (row) for the cumulative out of pocket annual contributions (investment), annual return, total return, average annual return, compound average annual return, internal rate of return (IRR), and compound average annual return. The compound average annual return is included twice so that when the graphs with average annual return and IRR are created, there is consistency with line colors and symbols.

d. Rate of Return Comparisons—this section includes the calculations needed for determining the differences between various rates of return. Specifically, it shows the difference between the average annual return and the compound average annual return for each time period in one row and the difference between the IRR and the compound average annual return in the next row.

e. Net Present Value Calculations (NPV)—this section includes the calculations needed for determining the NPV of the investment at the end of each time period. The calculations were performed using the built in NPV (and also IRR) function of the Microsoft Excel spreadsheet. The discount rate used is the compound average annual rate of return. The information below is taken from Microsoft Excel Help. Note that the first year out of pocket contribution was added to the NPV assuming that the first payment was made at the beginning of the first time period.

f. NPV (as calculated using Excel 2003)—Calculates the net present value of an investment by using a discount rate and a series of future payments (negative values) and income (positive values).

Syntax

NPV(rate,value1,value2,)

Rate is the rate of discount over the length of one period.

Value1, value2, . . . are 1 to 29 arguments representing the payments and income.

i. Value1, value2, . . . must be equally spaced in time and occur at the end of each period.

ii. NPV uses the order of value1, value2, . . . to interpret the order of cash flows. Be sure to enter your payment and income values in the correct sequence.

iii. Arguments that are numbers, empty cells, logical values, or text representations of numbers are counted; arguments that are error values or text that cannot be translated into numbers are ignored.

iv. If an argument is an array or reference, only numbers in that array or reference are counted. Empty cells, logical values, text, or error values in the array or reference are ignored.

Remarks i. The NPV investment begins one period before the date of the value1 cash flow and ends with the last cash flow in the list. The NPV calculation is based on future cash flows. If your first cash flow occurs at the beginning of the first period, the first value must be added to the NPV result, not included in the values arguments. For more information, see the examples below.

ii. If n is the number of cash flows in the list of values, the formula for NPV is:

$$NPV = \text{value1}/(1+\text{rate})^1 + \text{value2}/(1+\text{rate})^2 + \ldots (\text{value}n/(1+\text{rate})^n)$$

iii. NPV is similar to the PV function (present value). The primary difference between PV and NPV is that PV allows cash flows to begin either at the end or at the beginning of the period. Unlike the variable NPV cash flow values, PV cash flows must be constant throughout the investment. For information about annuities and financial functions, see PV.

iv. NPV is also related to the IRR function (internal rate of return). IRR is the rate for which NPV equals zero: NPV(IRR(. . . ), . . . )=0.

g. Logical AND functions—this section includes the various comparisons for determining when to stop contributions. The first row compares the compound average annual return (CAAR) to the IRR and the total return to zero. A true result is obtained when the CAAR is greater than the IRR and the total return is greater than zero. The next row compares the NPV and the total return to zero. A true result is obtained when the NPV is less than zero and the total return is greater than zero. Contributions should be stopped when a true result is obtained. Including the comparison of the total return to zero eliminates the invalid crossover points. Note that it is possible to obtain an invalid true result in time period one for the comparison of the CAAR to the IRR when the total return is positive. In time period one all of the return calculations provide the same result, as shown to two decimal places. However, depending on how the calculations are made there may be a slight difference. In Microsoft Excel 2003 the IRR for time period one is actually 10.399999999970900% while the CAAR is 10.400000000000000%. For the purposes of the present invention they are equal but when Excel does the comparison the CAAR is greater than the IRR and an invalid true result is obtained. This problem can be eliminated by adding a very small number (insignificant in terms of the invention) to the IRR so that it is greater than the CAAR. The number chosen here is 0.00000001. Such an increment has no effect on the invention and could be added to the IRR in time period one. The comparisons were performed using the logical AND function of the Microsoft Excel spreadsheet. The information below is taken from Microsoft Excel Help.

h. AND

Returns TRUE if all its arguments are TRUE; returns FALSE if one or more argument is FALSE.

Syntax

AND(logical1,logical2, ... )

Logical1, logical2, ... are 1 to 30 conditions you want to test that can be either TRUE or FALSE.

Remarks
  i. The arguments must evaluate to logical values such as TRUE or FALSE, or the arguments must be arrays or references that contain logical values.
  ii. If an array or reference argument contains text or empty cells, those values are ignored.
  iii. If the specified range contains no logical values, AND returns the #VALUE! error value.

Spreadsheet 1 is a template of what was used for the analysis of fund #1, fund #2, and fund #3.

FIGS. 19A-19F: Spreadsheet 2—formulas is a copy of spreadsheet 1—fund #1, except that it shows the formulas used in the calculations rather than the results.

FIGS. 20A-20C: Spreadsheet 3—fund #2 shows the same information described above for fund #2.

FIGS. 21A-21D: Spreadsheet 4—fund #3 shows the same information described above for fund #3.

FIGS. 22A-22B: Spreadsheet 5—fund #4 shows the same information described above for fund #4. Additionally, it includes the calculations for the absolute value of the IRR and absolute value of the compound average annual return for fund #4. The calculations were performed using the built-in absolute value (ABS) function of the Microsoft Excel spreadsheet.

FIGS. 23A-23D: Spreadsheet 6—fund #4 formulas is a copy of spreadsheet 5—fund #4, except that it shows the formulas used in the calculations rather than the results.

The identification of the crossover points, which indicate whether investments should be stopped, restarted, or stopped again, may occur by many different pathways, as described above. In one scheme, the investment data is plotted out and the investor visually inspects the plots to identify the crossover points. In another scheme, a computer program outputs a message to the investor that a crossover point has occurred, and the investment data that supports the outputted message may be shown to the investor with or without a graph, if desired. The computer program may be associated with an investor's personal financial software or it may be hosted by a service provider that may or may not have access to the investor's financial data.

Although a dollar cost averaging strategy was used to accumulate assets in the examples described above, the scope of the present invention includes other embodiments that use an asset accumulation strategy that makes purchases at regular or intermittent intervals. Such strategies include share averaging, value averaging, and random purchases. They also include purchases of individual stock through Direct Investment Programs and the like.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular examples disclosed, but it is intended to cover modifications within the spirit and scope of the present invention as defined by the appended claims.

What is claimed is:

1. An article of manufacture for making decisions regarding funding additional contributions to an investment that is funded using an asset accumulation strategy, the article of manufacture comprising a non-transitory tangible computer-readable medium encoded with computer-executable instructions for performing a method comprising:
  (a) automatically determining in a data processor for a plurality of successive time instances:
    (i) an absolute value of a compound average annual rate of return of the investment, and
    (ii) an absolute value of an internal rate of return of the investment;
  (b) the data processor identifying a first time instance when the absolute value of the compound average annual rate of return of the investment exceeds the absolute value of the internal rate of return of the investment, wherein the first time instance represents the time in which it is recommended that funding of additional contributions to the investment should be stopped; and
  (c) the data processor outputting a message recommending that funding of additional contributions to the investment should be stopped upon identifying the first time instance.

2. The article of manufacture of claim 1 wherein an investment of an investor's funds is made in one or more investment companies, and the computer-executable instructions perform a method further comprising:

(d) an investment management computer communicating an investor's investment information to the data processor for use by the data processor in performing steps (a) and (b).

3. The article of manufacture of claim 1 wherein the computer-executable instructions perform a method further comprising:

(d) the data processor identifying one or more additional time instances when the absolute value of the compound average annual rate of return of the investment exceeds the absolute value of the internal rate of return of the investment, wherein the one or more additional time instances represent additional times in which it is recommended that funding of additional contributions to the investment should be stopped.

4. The article of manufacture of claim 1 wherein the computer-executable instructions perform a method further comprising:

(d) the data processor identifying a second, subsequent time instance when the absolute value of the internal rate of return of the investment equals or exceeds the absolute value of the compound average annual rate of return of the investment; and (e) the data processor outputting a message recommending that funding of additional contributions to the investment should be restarted if additional contributions were previously stopped upon identifying the second, subsequent time instance.

5. The article of manufacture of claim 1 wherein the investment is a periodic purchase of shares in one or more investment companies.

6. The article of manufacture of claim 1 wherein step (b) is performed by plotting curves of time period vs. percent return for the absolute value of the compound average annual rate of return of the investment and the absolute value of the internal rate of return of the investment, and identifying a curve crossover point wherein the absolute value of the compound average annual rate of return curve exceeds the absolute value of the internal rate of return curve.

7. The article of manufacture of claim 1 wherein the computer-executable instructions perform a method further comprising:

(d) the data processor identifying a second, subsequent time instance when the absolute value of the internal rate of return of the investment equals or exceeds the absolute value of the compound average annual rate of return of the investment, wherein the second, subsequent time instance represents the time in which it is recommended that funding of additional contributions to the investment should be restarted.

8. An article of manufacture for making decisions regarding funding additional contributions to an investment that is funded using an asset accumulation strategy, the article of manufacture comprising a non-transitory tangible computer-readable medium encoded with computer-executable instructions for performing a method comprising:

(a) automatically determining in a data processor for a plurality of successive time instances:

(i) a compound average annual rate of return of the investment, (ii) an internal rate of return of the investment, and (iii) a total return of the investment;

(b) the data processor identifying a first time instance when the compound average annual rate of return of the investment exceeds the internal rate of return of the investment and when the total return of the investment is greater than zero, wherein the first time instance represents the time in which it is recommended that funding of additional contributions to the investment should be stopped; and (c) the data processor outputting a message recommending that funding of additional contributions to the investment should be stopped upon identifying the first time instance.

9. The article of manufacture of claim 8 wherein an investment of an investor's funds is made in one or more investment companies, and the computer-executable instructions perform a method further comprising:

(d) an investment management computer communicating an investor's investment information to the data processor for use by the data processor in performing steps (a) and (b).

10. The article of manufacture of claim 8 wherein the computer-executable instructions perform a method further comprising:

(d) the data processor identifying one or more additional time instances when the compound average annual rate of return of the investment exceeds the internal rate of return of the investment and when the total return of the investment is greater than zero, wherein the one or more additional time instances represent additional times in which it is recommended that funding of additional contributions to the investment should be stopped.

11. The article of manufacture of claim 8 wherein the computer-executable instructions perform a method further comprising:

(d) the data processor identifying a second, subsequent time instance when the internal rate of return of the investment equals or exceeds the compound average annual rate of return or when the total return of the investment is less than or equal to zero; and (e) the data processor outputting a message recommending that funding of additional contributions to the investment should be restarted if additional contributions were previously stopped upon identifying the second, subsequent time instance.

12. The article of manufacture of claim 8 wherein the investment is a periodic purchase of shares in one or more investment companies.

13. The article of manufacture of claim 8 wherein step (b) is performed by plotting curves of time period vs. percent return for the compound average annual rate of return of the investment and the internal rate of return of the investment, and identifying a curve crossover point wherein the compound average annual rate of return curve exceeds the internal rate of return curve and when the total return is greater than zero.

14. The article of manufacture of claim 8 wherein the computer-executable instructions perform a method further comprising:

(d) identifying a second, subsequent time instance when the internal rate of return of the investment equals or exceeds the compound average annual rate of return or when the total return of the investment is less than or equal to zero, wherein the second, subsequent time instance represents the time in which it is recommended that funding of additional contributions to the investment should be restarted.

15. An article of manufacture for making decisions regarding funding additional contributions to an investment that is funded using an asset accumulation strategy, the article of manufacture comprising a non-transitory tangible computer-readable medium encoded with computer-executable instructions for performing a method comprising:
- (a) automatically determining in a data processor for a plurality of successive time instances a compound average annual rate of return of the investment, wherein the compound average annual rate of return of the investment is used as a discount rate in calculating a net present value of the investment for a plurality of successive time instances; and
- (b) automatically determining in a data processor for a plurality of successive time instances the net present value of the investment and a total return of the investment;
- (c) the data processor identifying a first time instance when the net present value of the investment is less than zero and the total return of the investment is greater than zero, wherein the first time instance represents the time in which it is recommended that funding of additional contributions to the investment should be stopped; and
- (d) the data processor outputting a message recommending that funding of additional contributions to the investment should be stopped upon identifying the first time instance.

16. The article of manufacture of claim 15 wherein the investment of an investor's funds is made in one or more investment companies, and the computer-executable instructions perform a method further comprising:
- (e) an investment management computer communicating an investor's investment information to the data processor for use by the data processor in performing steps (a) and (b).

17. The article of manufacture of claim 15 wherein the computer-executable instructions perform a method further comprising:
- (e) the data processor identifying one or more additional time instances when the net present value of the investment is less than zero and the total return of the investment is greater than zero, wherein the one or more additional time instances represent additional times in which it is recommended that funding of additional contributions to the investment should be stopped.

18. The article of manufacture of claim 15 wherein the computer-executable instructions perform a method further comprising:
- (e) identifying a second, subsequent time instance when the net present value is greater than or equal to zero or the total return is less than or equal to zero; and
- (f) the data processor outputting a message recommending that funding of additional contributions to the investment should be restarted if additional contributions were previously stopped upon identifying the second, subsequent time instance.

19. The article of manufacture of claim 15 wherein the investment is a periodic purchase of shares in one or more investment companies.

20. The article of manufacture of claim 15 wherein the computer-executable instructions perform a method further comprising:
- (e) the data processor identifying a second, subsequent time instance when the net present value is greater than or equal to zero or the total return is less than or equal to zero, wherein the second, subsequent time instance represents the time in which it is recommended that funding of additional contributions to the investment should be restarted.

21. The article of manufacture of claim 15 wherein step (c) is performed by plotting a curve of time period vs. the net present value of the investment and identifying a point wherein the net present value is less than zero and when the total return is greater than zero.

* * * * *